US 6,535,706 B1

(12) United States Patent
Konno

(10) Patent No.: US 6,535,706 B1
(45) Date of Patent: Mar. 18, 2003

(54) IMAGE EDITING SYSTEM AND IMAGE FORMING SYSTEM

(75) Inventor: Miki Konno, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 104 days.

(21) Appl. No.: 09/693,856

(22) Filed: Oct. 23, 2000

(51) Int. Cl.[7] ............................................. G03G 15/36
(52) U.S. Cl. ..................... 399/182; 399/183; 399/184; 358/452; 358/453
(58) Field of Search ................................ 399/182, 183, 399/184, 185, 366; 358/448, 452, 453; 382/276, 282, 283, 287, 162, 165

(56) References Cited

U.S. PATENT DOCUMENTS

| 5,608,544 A | | 3/1997 | Yamanishi | 358/453 |
| 5,937,232 A | * | 8/1999 | Taguchi et al. | 399/182 X |
| 5,974,171 A | * | 10/1999 | Hayashi et al. | 382/162 |
| 6,025,862 A | * | 2/2000 | Thompson | 399/184 X |
| 6,192,127 B1 | * | 2/2001 | Nagashima et al. | 399/366 |

FOREIGN PATENT DOCUMENTS

JP 8-18764 1/1996

* cited by examiner

*Primary Examiner*—Hoan Tran
(74) *Attorney, Agent, or Firm*—Foley & Lardner

(57) ABSTRACT

An image forming system has a color scanner; an image processing part for processing image data obtained by reading a document by use of the color scanner; and an image forming part for forming an image on the basis of image data processed by the image processing part, wherein the color scanner reads a first original which includes a portion of a character or diagram having a first color, and a portion which is marked in a second color different from the first color so as to cover information of the character or diagram, and the image processing part edits image data of the marked portion of image data of the read first original. The editing process includes a process for rectangularizing the marked portion, and a process for connecting the rectangularized regions when the rectangularized regions are close to each other.

18 Claims, 18 Drawing Sheets

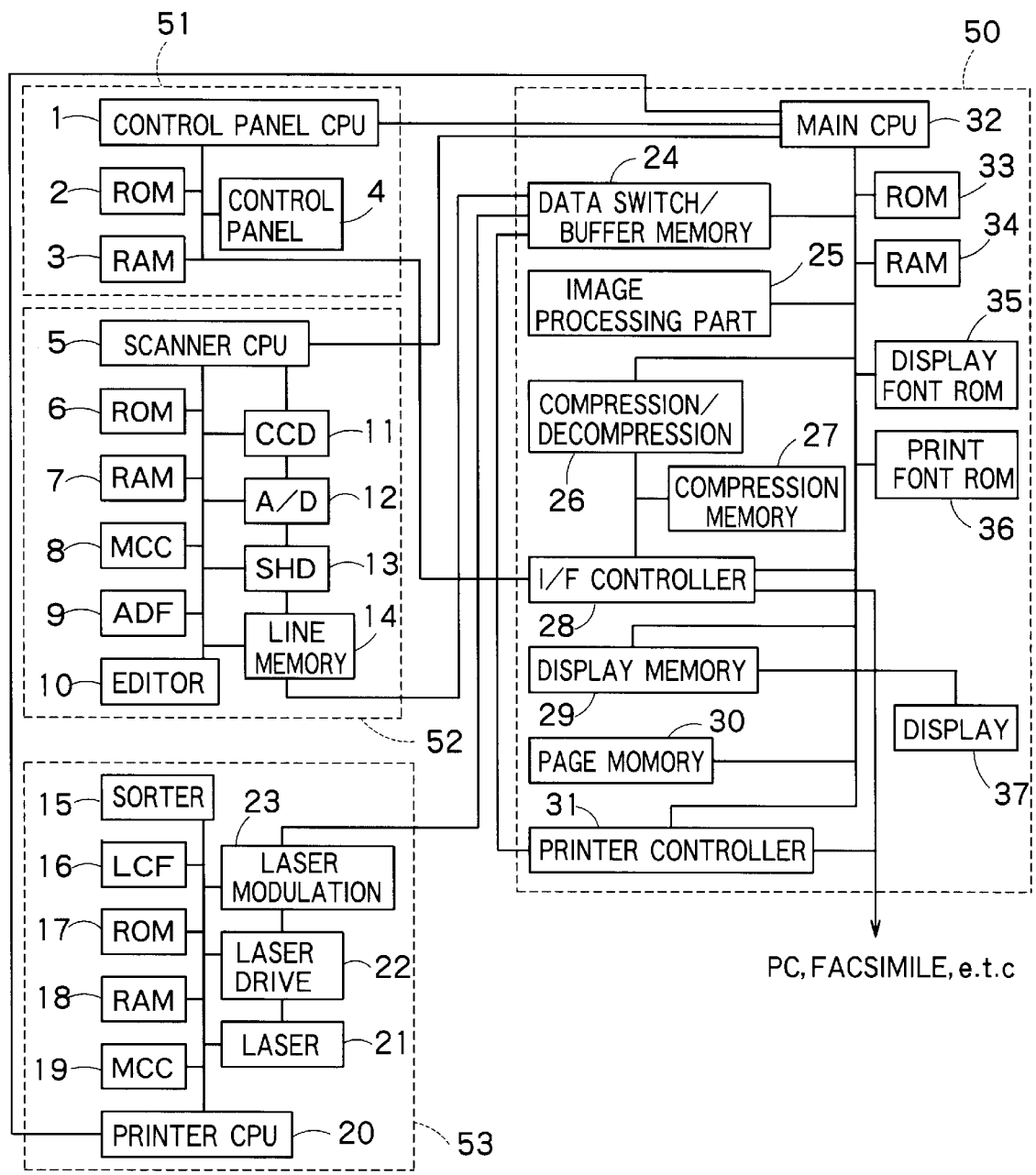
F I G. 3

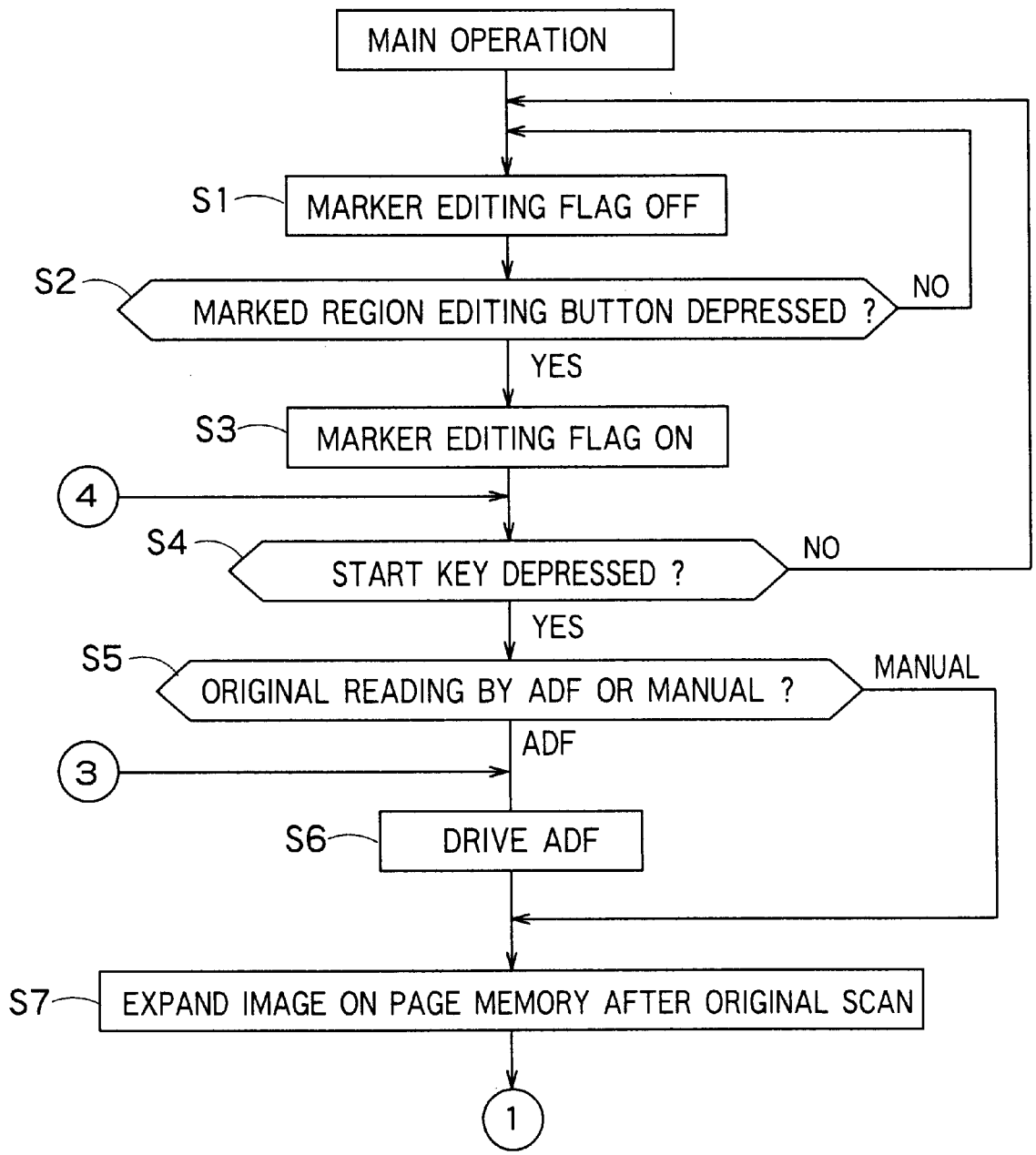
F I G. 4

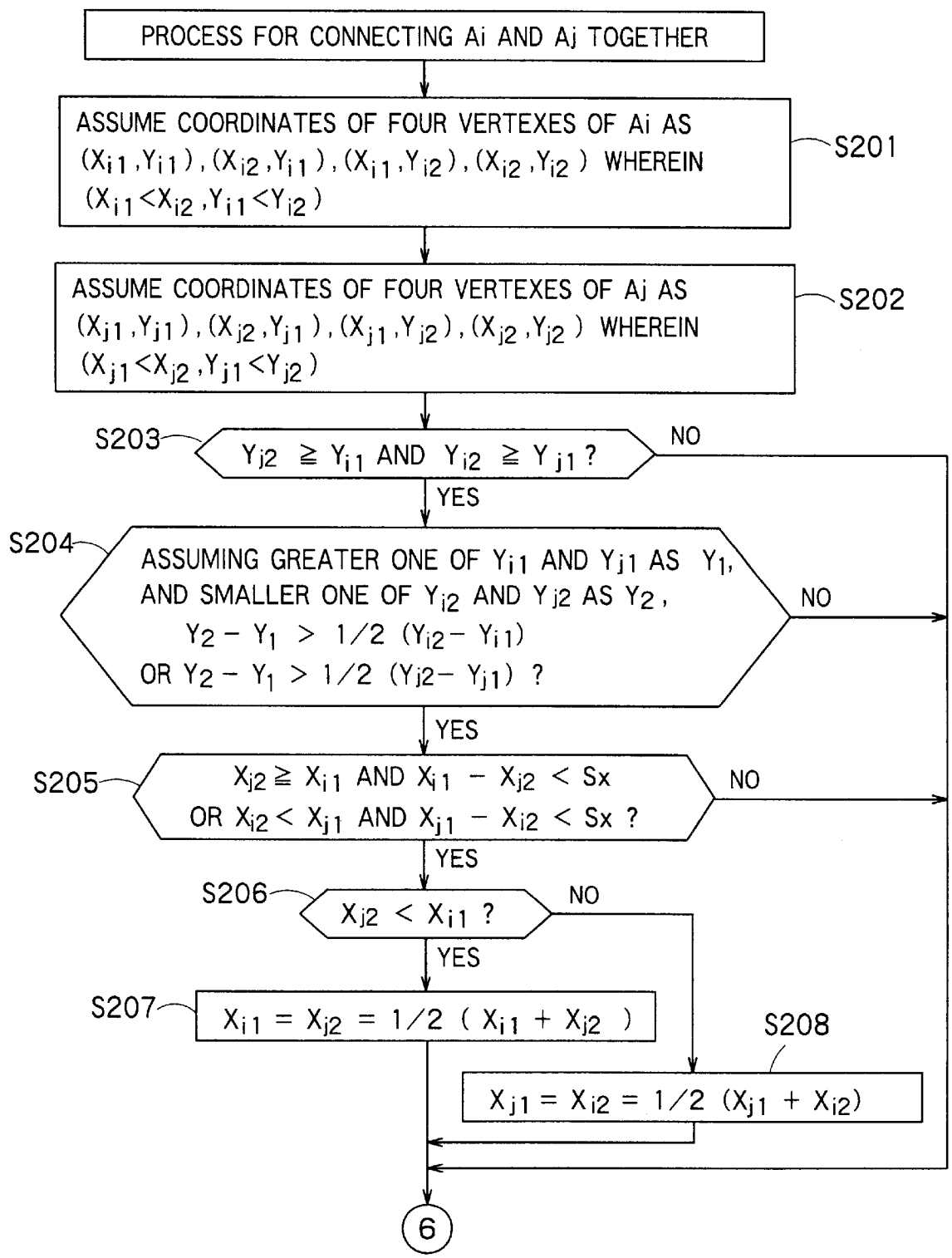
F I G. 10

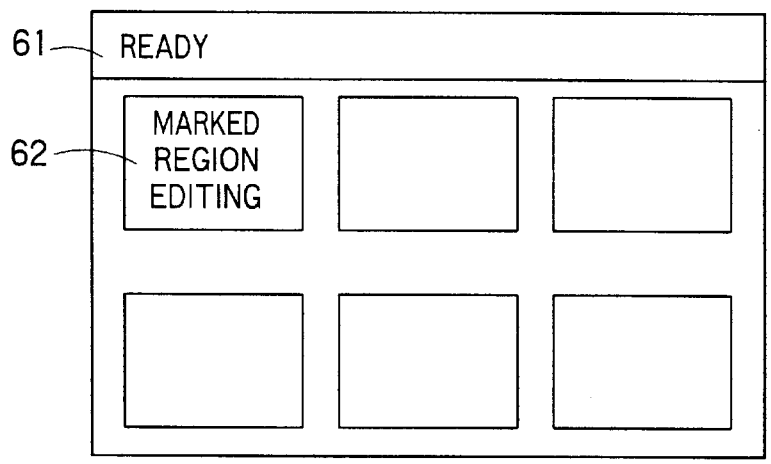
F I G. 12
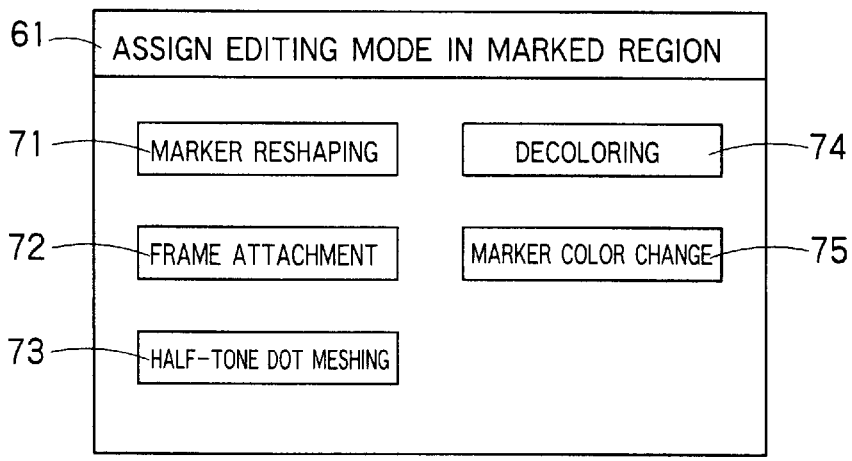
F I G. 13
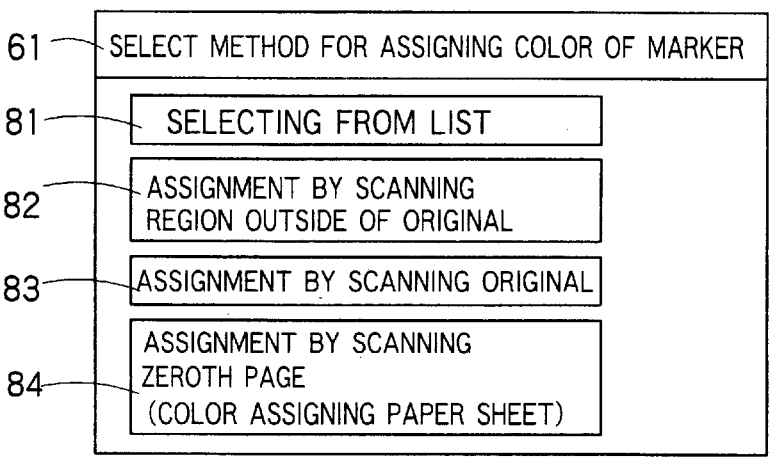
F I G. 14

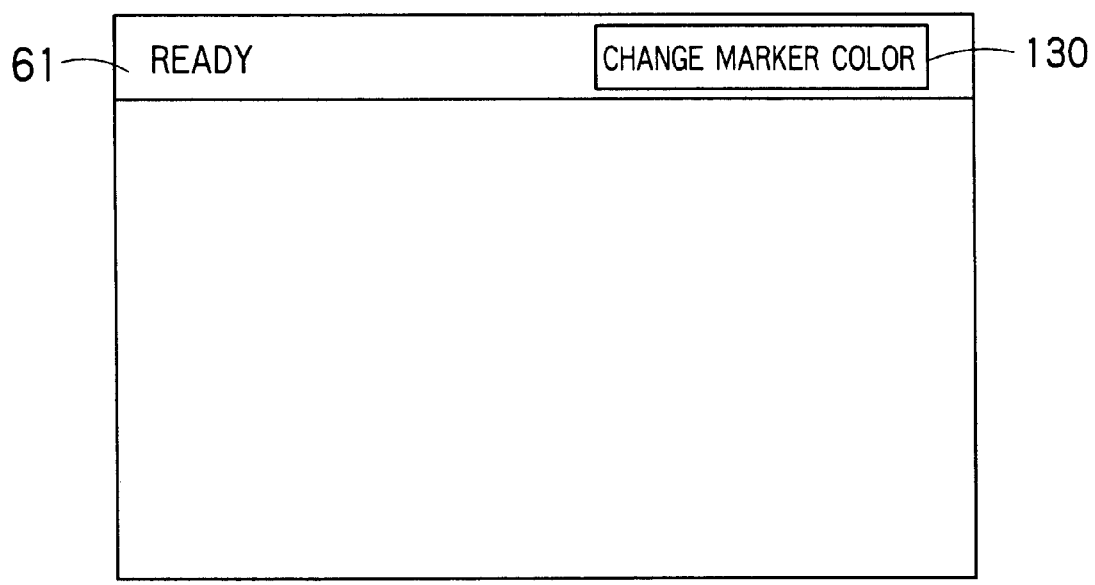
F I G. 25

IMAGE EDITING SYSTEM AND IMAGE FORMING SYSTEM

BACKGROUND OF THE INVENTION

1. Field of the Invention

The present invention relates generally to an image forming system and an image editing system. More specifically, the invention relates to an image editing system for editing a marked portion of a document on which a mark has been put with a line marker in a part to which a reader's attention has been intended to be called, and an image forming system having the same.

2. Related Background Art

It is widely carried out to put marks on important information on a document, which has been printed on a paper sheet, with a fluorescent line marker or the like to make the information stand out to call a reader's attention to the information.

However, if lines are manually drawn with a line marker, the lines are often inclined or slightly swayed up and down or from side to side to meander so as not to be straight. Therefore, there are some cases where the document on which the lines are drawn with the line marker is more illegible.

In order to avoid such a situation, the lines are sometimes drawn using a ruler. However, if such measures are taken, there is a problem in that line drawing efficiency deteriorates.

SUMMARY OF THE INVENTION

It is therefore an object of the present invention to eliminate the aforementioned problems and to provide an image editing system capable of easily realizing a simple document editing by carrying out a desired editing process on a marked portion of a document on which a mark has been put with a line marker, and an image forming system having the image editing system.

According to a first aspect of the present invention, there is provided an image editing system comprising: a color scanner; and an image processing part for processing image data obtained by reading a document by means of the color scanner; wherein the color scanner reads a first original which includes a portion of a character or diagram having a first color, and a portion which is marked in a second color different from the first color so as to cover information of the character or diagram, and, the image processing part edits image data of the marked portion of image data of the read first original.

The image editing system preferably further comprises means for indicating a change of the second color during the scanning of the first original by the color scanner.

According to a second aspect of the present invention, there is provided an image forming system comprising: a color scanner; an image processing part for processing image data obtained by reading a document by means of the color scanner; and an image forming part for forming an image on the basis of image data processed by the image processing part; wherein the color scanner reads a first original which includes a portion of a character or diagram having a first color, and a portion which is marked in a second color different from the first color so as to cover information of the character or diagram, and, the image processing part edits image data of the marked portion of image data of the read first original.

In a preferred embodiment of the invention, the image processing part rectangularizes the shape of the contour of the marked portions on the basis of the image data of the marked portions, recognizes the position of vertexes of the rectangularized regions, connects the rectangularized regions neighboring each other on the basis of positional information of the vertexes and prepares image data including information of the shape of the connected regions and the character or diagram in the connected regions. A line mark which is drawn manually and which has a turbulent contour in shape is thereby corrected to an orderly line mark and the image thereof is printed.

Editing processes by the image processing part may include a process for erasing information of the second color except for at least a part of a peripheral portion of the rectangularized regions and for preparing image data of a thin line having the second color on the basis of image data of the connected regions. A line mark drawn in the original can thus easily erased.

The editing processes by the image processing part may also include a process for a half-tone dot meshing for image data of the connected regions.

In a further preferred embodiment the second color may include a plurality of colors, and the editing processes by the image processing part may include a process for editing a portion of the image data of the connected regions, the portion of the image data having the second color which is substantially the same as a desired color.

The image editing system or the image forming system may further comprise a storage device for previously storing therein image data of a plurality of third colors, a color display unit for displaying the third colors, and an input unit, and, the desired color may be a color which is selected from the third colors displayed on the color display unit and inputted to the image processing part.

The color scanner preferably reads a second original for assigning the desired color, the second original being painted in a fourth color, and the image editing system may further comprises a color display unit for displaying image data of the second original which is read by the color scanner and an input unit, and the desired color may be a color which is selected from the fourth colors displayed on the color display unit and inputted to the image processing part.

In addition the desired color may be a color which is selected from the image data of the first original.

In another preferred embodiment it is desirable that the image processing part changes the second color to a desired color.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 3 is a block diagram functionally showing the internal construction of the combined image forming system of FIG. 1;

FIGS. 4 through 6 are flow charts for schematically explaining the operation of an editing process in a marked region using the image forming system in the preferred embodiment;

FIGS. 10 and 11 are flowcharts for explaining the details of algorithm of the connecting process;

FIGS. 12 through 14 are illustrations showing the details of the operation of a marked region editing process;

FIG. 25 is an illustration for explaining a method for changing the color of a maker.

DESCRIPTION OF THE PREFERRED EMBODIMENTS

Referring now to the accompanying drawings, the preferred embodiments of the present invention will be described below. In the figures, the same reference numbers are given to the same portions to omit the descriptions thereof.

Figure 1:
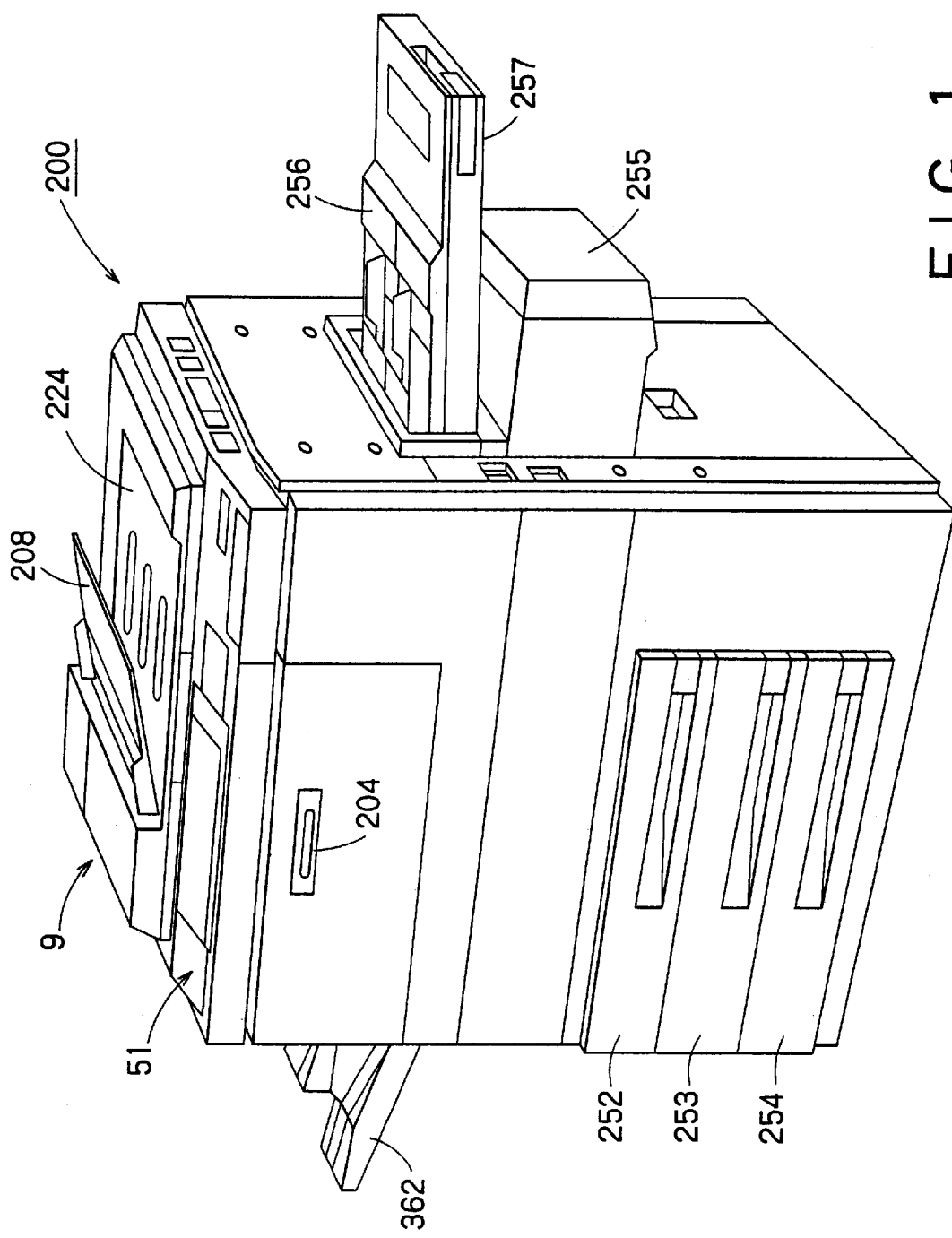
FIG. 1 is a perspective view showing the appearance of an example of a combined image forming system (a multi-function type copying machine) which has a preferred embodiment of an image editing system according to the present invention.

FIG. 1 is a perspective view showing the appearance of an example of a combined image forming system (a multi-function type copying machine) which has a preferred embodiment of an image editing system according to the present invention.

The combined image forming system shown in the figure comprises a system body 200, a control panel 51, an automatic document feeder (which will be hereinafter simply referred as an "ADF") 9, paper feed cassettes 252 through 254 and 257, and a large-capacity paper feed cassette 255. The ADF 9 is provided on the top of the system body 200 for automatically feeding a sheet-like original one by one, and is capable of being open and closed so as to also serve as an original cover. The control panel 51 is provided on the front portion of the top face of the system body 200.

The control panel 51 has various operation keys and indicators for indicating copying conditions and copying start. The paper feed cassettes 252, 253 and 254 are detachably mounted on the lower portion of the system body 200. In each of the paper feed cassettes 252 through 254, paper sheets having the same size are housed in longitudinal or lateral directions, and can be selected as needed. A discharge tray 362 is provided on the left side portion of the system body 200 for receiving copied paper sheets.

The paper feed cassette 257 and the large-capacity paper feed cassette 255 are detachably mounted on the right side portion of the system body 200 for housing therein paper sheets in small quantities and in large quantities, respectively. On the top face of the paper feed cassette 257, a manual insertion tray 256 is provided for manually feeding a paper sheet.

In the system body 200, an magnetic optical disk unit (not shown) is provided for receiving an magnetic optical disk which serves as a recording medium to store therein image data and so forth. In the upper portion of the front face of the system body 200 facing the optical magnetic disk unit, an inlet 204 is provided for inserting the magnetic optical disk.

The combined image forming system shown in FIG. 1 is provided with external interfaces, such as a parallel port, a serial port (not shown) and a SCSI, on the back face of the system body 200 although these interfaces are not shown in the perspective view. The parallel port is used for connecting the system to an external device, such as a personal computer (PC), when the system operates as a printer. The serial port is used for connecting the system to an external device, such as a PC, during the maintenance of the system in order to read internal control information of the system and in order to set the function of the system. The SCSI is used for carrying out a command/data communication between the system and an external controller which operates as a master.

Figure 2:
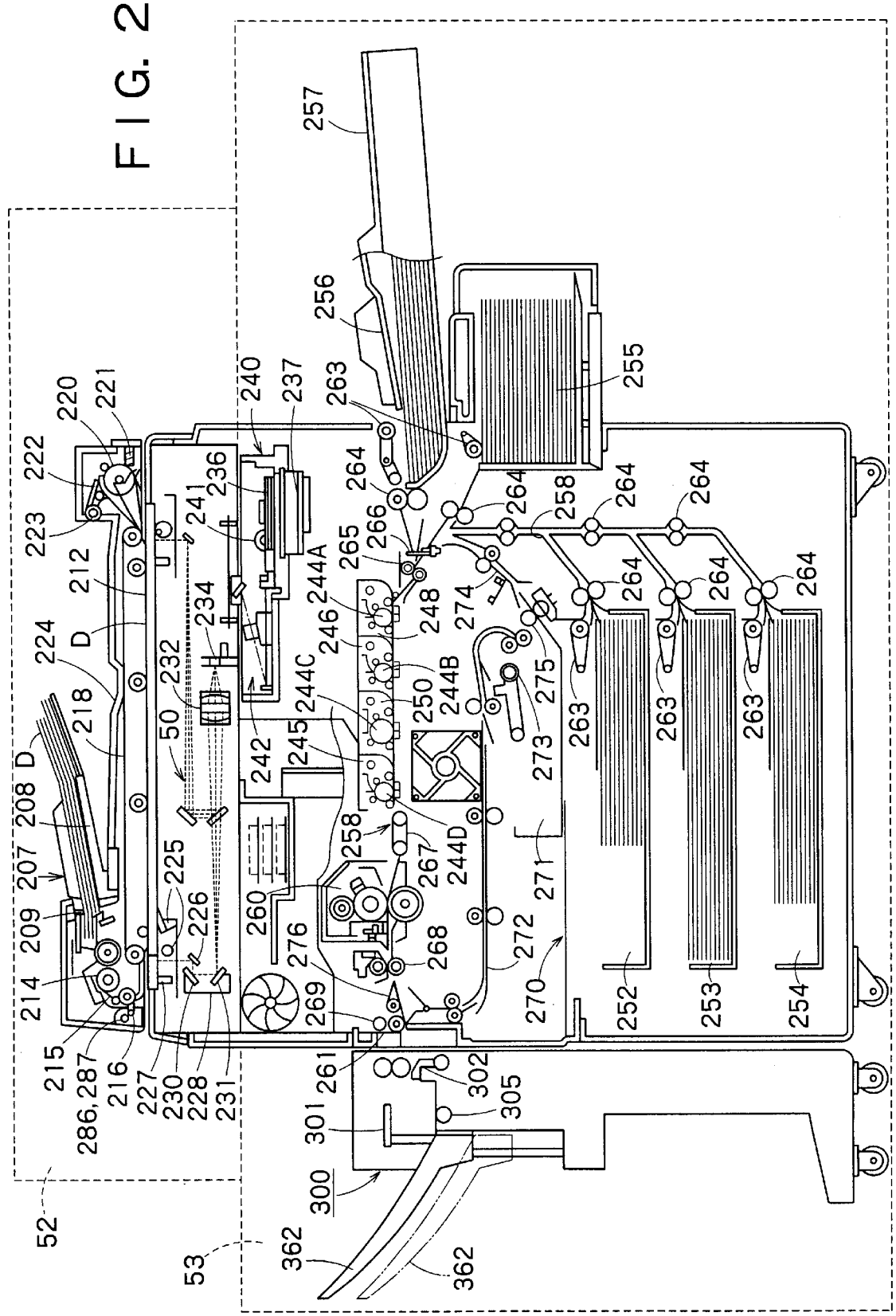
FIG. 2 is a schematic view structurally showing an example of the internal construction of the combined image forming system of FIG. 1.

FIG. 2 is a schematic diagram structurally showing an example of the internal construction of the combined image forming system of FIG. 1.

In order to realize copying and facsimile functions, a scanner part 52 serving as an acquisition means for acquiring image data, and a printer part 53 for forming images are provided in the system body 200.

On the top face of the system body 200, there are provided a platen 212 of a transparent glass on which an object to be read, i.e., an original D, is placed, and the ADF 9 for automatically feeding the original onto the platen 212. The ADF 9 can open and close the platen 212, and also functions as an original cover for tightly contacting the original D, which is mounted on the platen 212, with the platen 212.

The ADF 9 comprises: an original tray 208 on which originals D are set; an empty sensor 209 for detecting the presence of originals; a pickup roller 214 for taking the originals D, one by one, out of the original tray; a paper feed roller 215 for conveying the taken originals D; a pair of aligning rollers 216 for aligning the heads of the originals; an aligning sensor 286, provided upstream of the pair of aligning rollers 216, for detecting the arrival of the originals D; a size sensor 287 for detecting the size of the originals D; and a conveyor belt 218 provided so as to substantially cover the whole surface of the platen 212. The plurality of originals D which have been set on the original tray 208 so as to face upward are sequentially taken out from the bottom page, i.e., the final page to be aligned by the pair of aligning rollers 216 and are conveyed to predetermined position on the platen 212 by means of the conveyor belt 218.

In the ADF 9, at the opposite end portion to the pair of aligning rollers 216 via the conveyor belt 218, there are provided a reversing roller 220, a sheet sensor 221, a flapper 222 and a sheet discharge roller 223. The original D, the image information of which has been read by a scanner part 52 which will be described later, is sent from the top face of the platen 212 by means of the conveyor belt 218 to be discharged onto an original discharge portion 224 on the top face of the ADF 9 via the reversing roller 220, flapper 221 and sheet discharge roller 222.

When the reverse surface of the original D is to be read, the flapper 222 is switched to reverse the original D and the original D has been conveyed by the conveyor belt 218 by means of the reversing roller 220 to be sent to a predetermined position on the platen 212 again by means of the conveyor belt 218.

The ADF 9 includes a paper feed motor for driving the pickup roller 214, the paper feed roller 215 and the pair of aligning rollers 216 and a conveying motor for driving the conveyor belt 218, the reversing roller 220 and the sheet discharge roller 223.

The scanner part 52 provided in the system body 200 has a light source 225, such as a fluorescent lamp, for illuminating the original D mounted on the platen 212, and a first mirror 226 for deflecting the reflected light from the original D in a predetermined direction. The light source 225 and the first mirror 226 are mounted on a first carriage 227 which is provided below the platen 212. A size sensor (not shown) is mounted on the first carriage 216 for detecting the size of the original which is mounted on the platen 212. The first carriage 227 is arranged so as to be movable in parallel to the platen 212, and reciprocated below the platen by means of a driving motor via a toothed belt (not shown) and so forth.

Below the platen 212, there is provided a second carriage 228 which is movable in parallel to the platen 212. Second and third mirrors 230 and 231 for sequentially deflecting the reflected light from the original D, which has been deflected by the first mirror 226, are mounted on the second carriage 228 so as to be perpendicular to each other. The second carriage 228 is driven with respect to the first carriage 227 by means of a toothed belt and so on for driving the first carriage 227, and moved in parallel to the platen 212 at a half speed of that of the first carriage 227.

Below the platen 212, there are also provided an imaging lens 232 for focusing the reflected light from the third mirror 231 on the second carriage 228, and a CCD sensor 234 for receiving and photoelectric-transferring the reflected light focused by the imaging lens 232. The imaging lens 232 is provided in a plane, which includes the optical axis of light deflected by the third mirror 231, so as to be movable via a driving mechanism, and is designed to form an image of the reflected light at a desired magnification by the movement of the imaging lens itself. The CCD sensor 234 is designed to receive the entering reflected light, to convert it into electric signals and to output the signals corresponding to the read original D.

The printer part 53 has a laser exposure device 240 serving as an exposure means. The laser exposure device 240 comprises: a semiconductor laser 241 serving as a light source; a polygonal mirror 236 serving as a scanning member for continuously deflecting laser beams which are emitted from the semiconductor laser 241; a polygon motor 237 serving as a scanning motor for rotating the polygonal mirror at a predetermined speed of rotation which will be described later; and an optical system 242 for deflecting the laser beams from the polygonal mirror to lead the deflected laser beams to a photosensitive drum which will be described later. The laser exposure device 240 with such a construction is fixed and supported on a supporting frame, which will be described later, of the system body 200.

The semiconductor laser 241 is on-off-controlled in accordance with image information of the original D which has been read by the scanner part 52. The laser beams are directed toward the photosensitive drum via the polygonal mirror 236 and the optical system 242 and scan the circumferential surface of the photosensitive drum to form an electrostatic latent image on the circumferential surface of the drum.

The image forming part 50 has a rotatable photosensitive drum 244 serving as an image carrier which is provided substantially at the center of the system body 200. The circumferential surface of the photosensitive drum 244 is exposed to the laser beams from the laser exposure device 240 to form a desired electrostatic latent image thereon.

Around the photosensitive drum 244, there are sequentially arranged: a charger 245 for charging the circumferential surface of the drum with a predetermined charge; a developer 246 for supplying a toner serving as a developing agent to the electrostatic latent image, which has been formed on the circumferential surface of the photosensitive drum 244, to develop the electrostatic latent image at a desired image density; a discharge 247 for separating an image forming medium, i.e., a copy paper sheet P, which has been fed from the paper feed cassette 252, 253, 254, 255 or 257, from the photosensitive drum 244; a transfer charger 248 for transferring a toner image, which has been formed on the photosensitive drum 244, onto the paper sheet P; a peeling pawl 249 for peeling the copy paper sheet from the circumferential surface of the photosensitive drum 244; a cleaning device 250 for cleaning any residual toner on the circumferential surface of the photosensitive drum 244; and a charge remover 251 for removing any residual charge on the circumferential surface of the photosensitive drum 244.

In the lower portion of the system body 200, the paper feed cassettes 252, 253 and 254 capable of being drawn from the system body 200 respectively are arranged so as to be stacked on each other. Copy paper sheets stored in the respective cassettes have different sizes. Around the side of these cassettes, the large-capacity paper feed cassette 255 is provided. The large-capacity paper feed cassette 255 is designed to house therein about 3,000 copy paper sheets having a frequency-used size, e.g., A4 size. Above the large-capacity paper feed cassette 255, the paper feed cassette 257 also serving as the manual insertion tray 256 is detachably provided.

In the system body 200, there is formed a conveying path 258 which extends from each of the cassettes to pass through a transfer part positioned between the photosensitive drum 244 and the transfer charger 248. At the trailing end of the conveying path, a fixing device 260 is provided.

In the vicinity of each of the paper feed cassettes 252, 253, 254, 255 and 257, a pickup roller 263 is provided for taking paper sheets, one by one, out of a corresponding one of the cassettes. In the conveying path 258, there are provided a plurality of pairs of paper feed rollers 264 for conveying copy paper sheet P, which have been taken out by means of the pickup roller 263, along the conveying path 258.

Along the conveying path 258, a pair of registration rollers 265 are provided upstream of the photosensitive drum 244. The pair of registration rollers 265 are designed to correct any skew of the taken copy paper sheet P and to assign the leading end of the toner image on the photosensitive drum 244 with that of the copy paper sheet P and to feed the copy paper sheet P to the transfer station at the same speed as the moving speed of the circumferential surface of the photosensitive drum 244. On the downstream side of the pair of registration rollers 265, i.e., on the side of the paper feed roller 264, an aligning sensor 266 is provided for detecting the arrival of the copy paper sheet P.

The copy paper sheet P taken, one by one, out of each of the cassettes by means of the pickup roller 263 is fed to the pair of registration rollers 265 by means of the pair of paper feed rollers 264. Then, the copy paper sheet P is fed to the transfer station after the leading end of the copy paper sheet P is registered by the pair of registration rollers 265. In the transfer station, a developed image, i.e., a toner image, which has been formed on the photosensitive drum 244, is transferred to the paper sheet P by means of the transfer charger 248. The copy paper sheet P to which the toner image has been transferred is peeled off from the circumferential surface of the photosensitive drum 244 by means of the discharge 247 and the peeling pawl 249 and is conveyed to the fixing device 260 via a conveyor belt 267 which defines a part of the conveying path 258. Then, after the developed image is fused and fixed on the copy paper sheet P by means of the fixing device 260, the copy paper sheet P is discharged from an outlet 261 to a discharge tray 262 by means of a pair of paper feed rollers 268 and a pair of sheet discharge rollers 269.

Below the conveying path 258, an automatic duplexing device (ADD) 270 is provided for reversing and feeding the copy paper sheet P, which has passed through the fixing device 260, to the pair of registration rollers 265 again. The automatic duplexing device 270 comprises: a temporary stacker for temporarily stacking the copy paper sheets P; a reversing path 272 branching from the conveying path 258 for reversing and leading the copy paper sheet P, which has passed through the fixing device 260, to the temporary stacker 271; a pickup roller 273 for picks up the copy paper sheets P, which have been stacked in the temporary stacker 271, one by one; and a paper feed roller 275 for feeding the picked up paper sheet to the pair of registration rollers 265 via the conveying path 274.

The branching portion of the reversing path 272 from the conveying path 258 is provided with a selector gate 276 for selectively distributing the copy paper sheets P to the outlet 261 or the reversing path 272.

When a double-sided copying is carried out, the copy paper sheet P passing through the fixing device 260 is lead to the reversing path 272 by means of the selector gate 276, and temporarily stacked in the temporary stacker 271 after being reversed. Thereafter, the copy paper sheet P is fed to the pair of registration rollers 265 via the conveying path 274 by means of the pickup roller 273 and the pair of paper feed rollers 275. Then, the copy paper sheet P is registered by the pair of registration rollers 265 and is then fed to the transfer station again, in which the toner image is transferred onto the reverse surface of the copy paper sheet P. Thereafter, the copy paper sheet P is discharged to the discharge tray 262 via the conveying path 258, fixing device 260 and sheet discharge roller 269.

By using this automatic duplexing device 270, the printed surface of the paper sheet can be discharged so as to face downward.

FIG. 3 is a block diagram showing a control system of the combined image forming system shown in FIGS. 1 and 2. This system comprises a basic processing part 50 controlled by a main CPU 32, a control panel part 51 controlled by a control panel CPU 1, a scanner part 52 controlled by a scanner CPU 5, and a printer engine part 53 controlled by a printer CPU 20. The basic processing part 50 and the control panel part 51 constitute an image editing system in this preferred embodiment. The main CPU 32 communicates with the control panel CPU 1, the scanner CPU 5 and the printer CPU 20 to control these CPUs.

The control panel CPU 1 is connected to a ROM 2 and a RAM 3 to carry out the detection of switches (buttons) on the control panel 4, the turning ON and OFF of LEDs, and the control of indicators on the basis of data of the ROM 2 and RAM 3.

The scanner CPU 5 communicates with the main CPU 32 to be controlled by the main CPU 32 so that the scanner CPU 5 controls the ADF 9, an editor (coordinate input device) 10, an A/D (analog-to-digital converter circuit) 12, an SHD (shading correcting circuit) 13, a line memory circuit 14, and a controller for mechanical devices (MCC) 8 which is designed to control mechanism elements, such as motors and solenoids.

The printer CPU 20 communicates with the main CPU 32 to be controlled by the main CPU 32 so that the printer CPU 20 controls a sorter 15, a large cassette feeder (LCF) 16, a laser modulation circuit 23, a laser drive circuit 22, and controller for mechanical devices 19 which is designed to control motors, solenoids, switches and the like.

The main CPU 32 is connected to a ROM 33, a RAM 34, a data switch/buffer memory circuit 24, an image processing part 25 which is characteristic in this preferred embodiment, a compressing/decompressing circuit 26, a page memory circuit 30, a display memory circuit 29, a printer controller circuit 31, a display font ROM 35, a print font ROM 30, a compression memory 27, and an I/F controller circuit 28.

The ROM 33 is designed to store therein a program for controlling the main CPU 32. The RAM 34 is designed to provide a work area for the main CPU 32. The data switch/buffer memory circuit 24 is designed to carry out the switching and buffering as to where data read by the scanner 52 are transferred or which data are transferred to the printer engine. As will be described later, the image processing circuit 25 is designed to carry out various editing processes in a marked region of image data acquired from the scanner. The compressing/decompressing circuit 26 is designed to compress and decompress image data. The page memory circuit 30 is designed to store therein image data page by page. The display memory circuit 29 is designed to cause a display 37 to display images thereon. The printer controller circuit 31 is designed to expand code data inputted from a personal computer or the like into image data. The display font ROM 35 is designed to expand code data on the page memory 30. The compression memory 27 is designed to store therein data which have been compressed by the compressing/decompressing circuit 26. The I/F controller circuit 28 is designed to interface personal computers and facsimiles.

Referring to the accompanying drawings, the operation of the combined image forming system in this preferred embodiment for editing a marked region in an original D will be described below.

Figure 5:
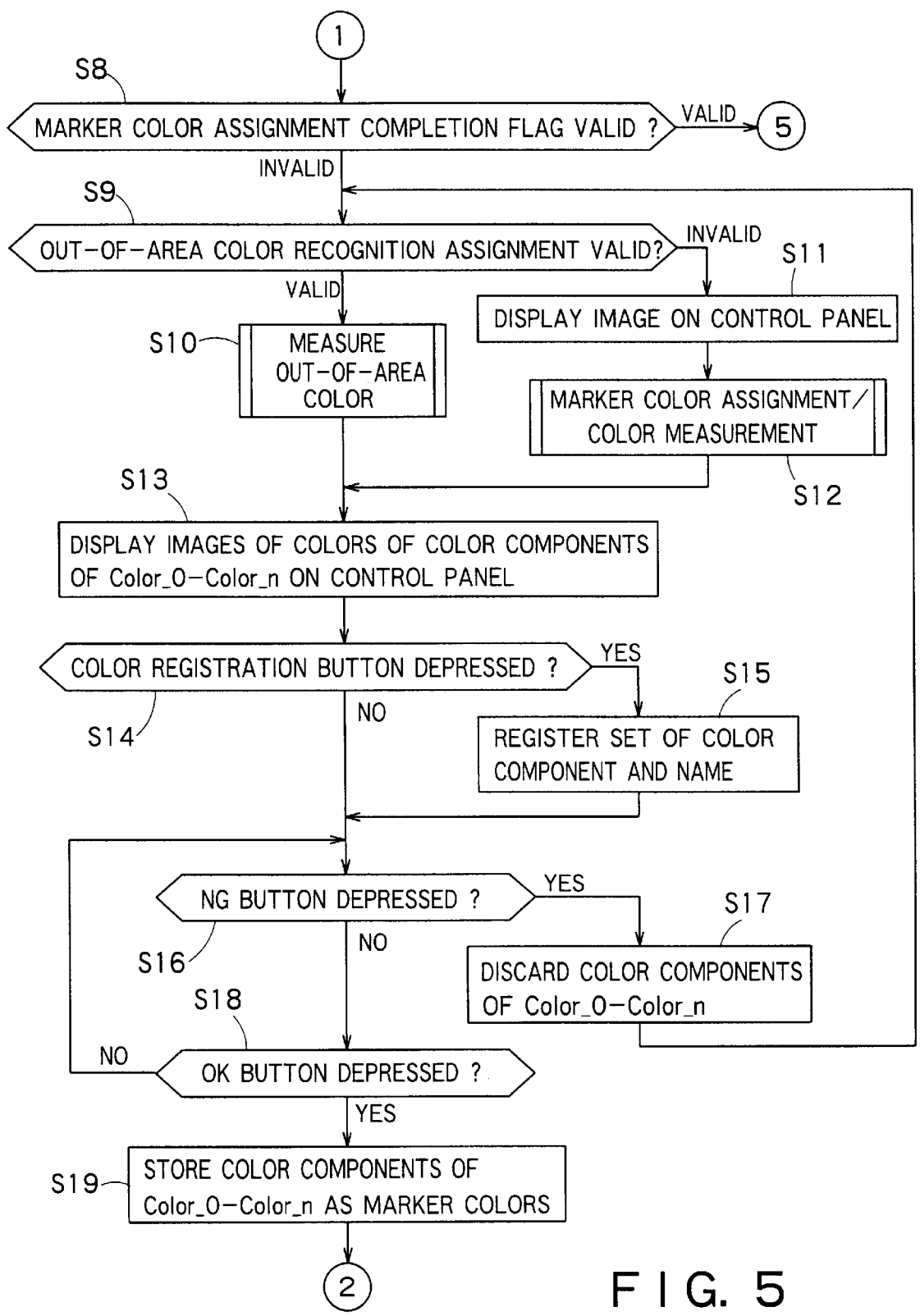
Figure 6:
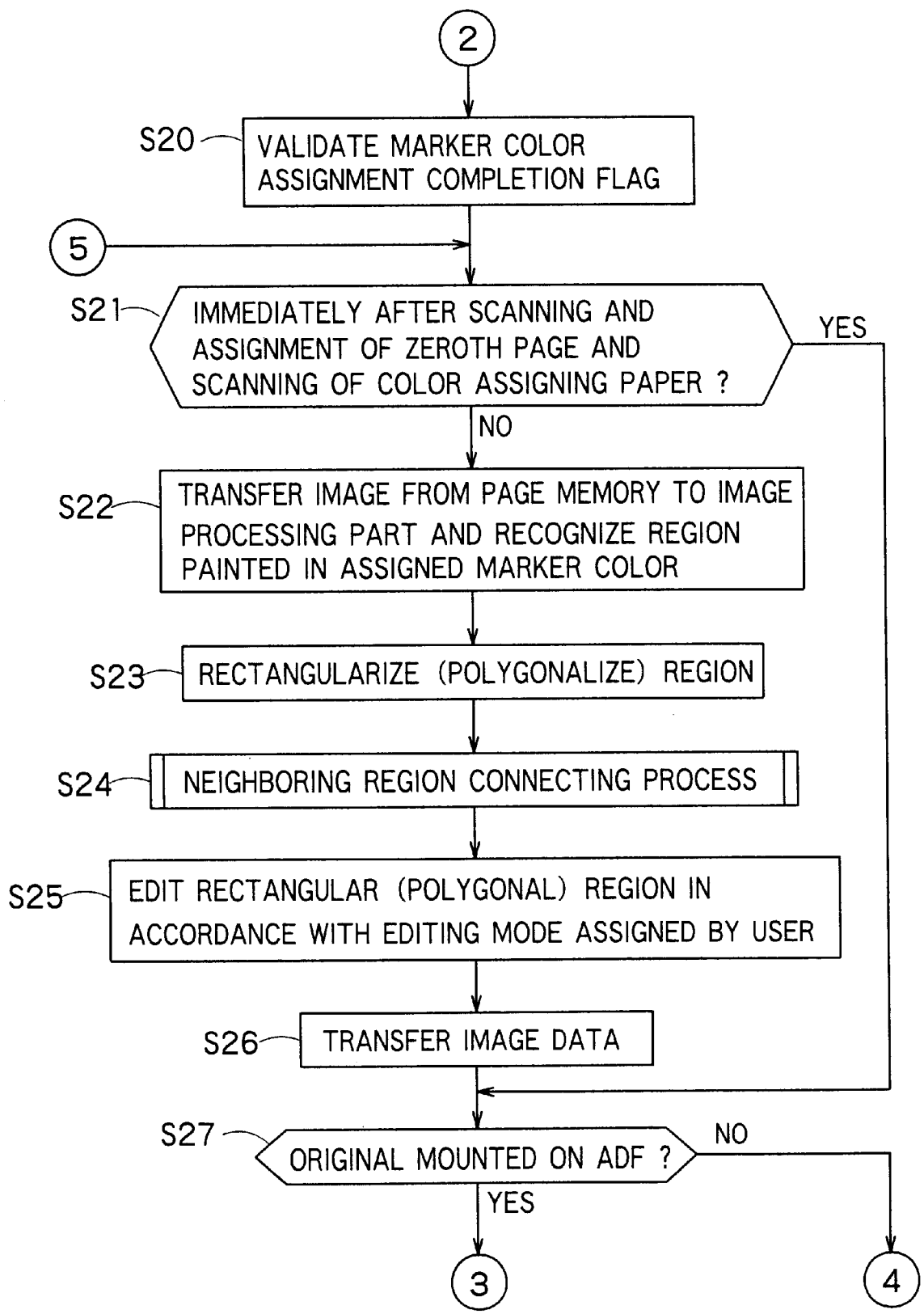
Figure 7:
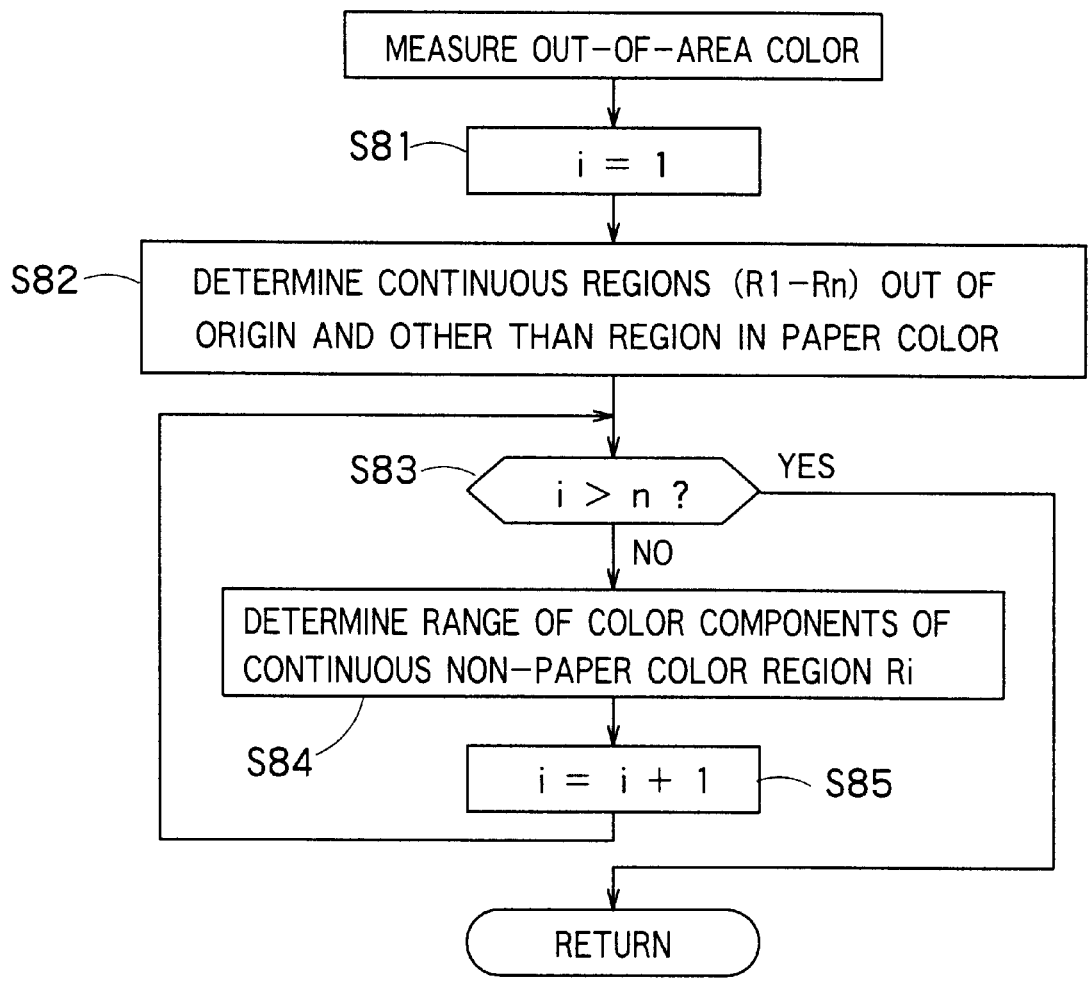
FIG. 7 is a flow chart for explaining the details of the procedure for carrying out an out-of-area color measurement.
Figure 8:
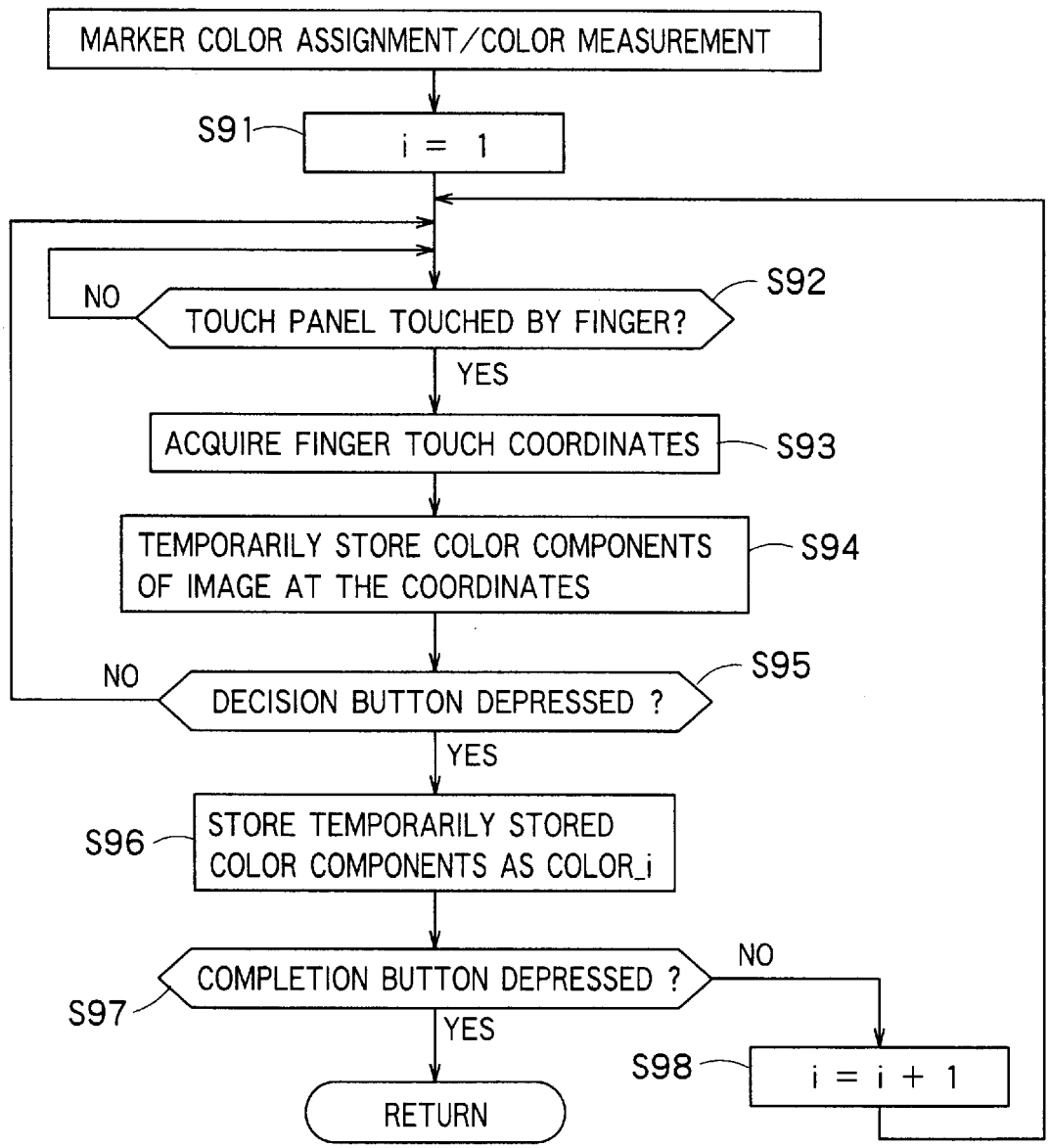
FIG. 8 is a flow chart for explaining the details of the procedure for carrying out a marker color assignment/color measurement.
Figure 9:
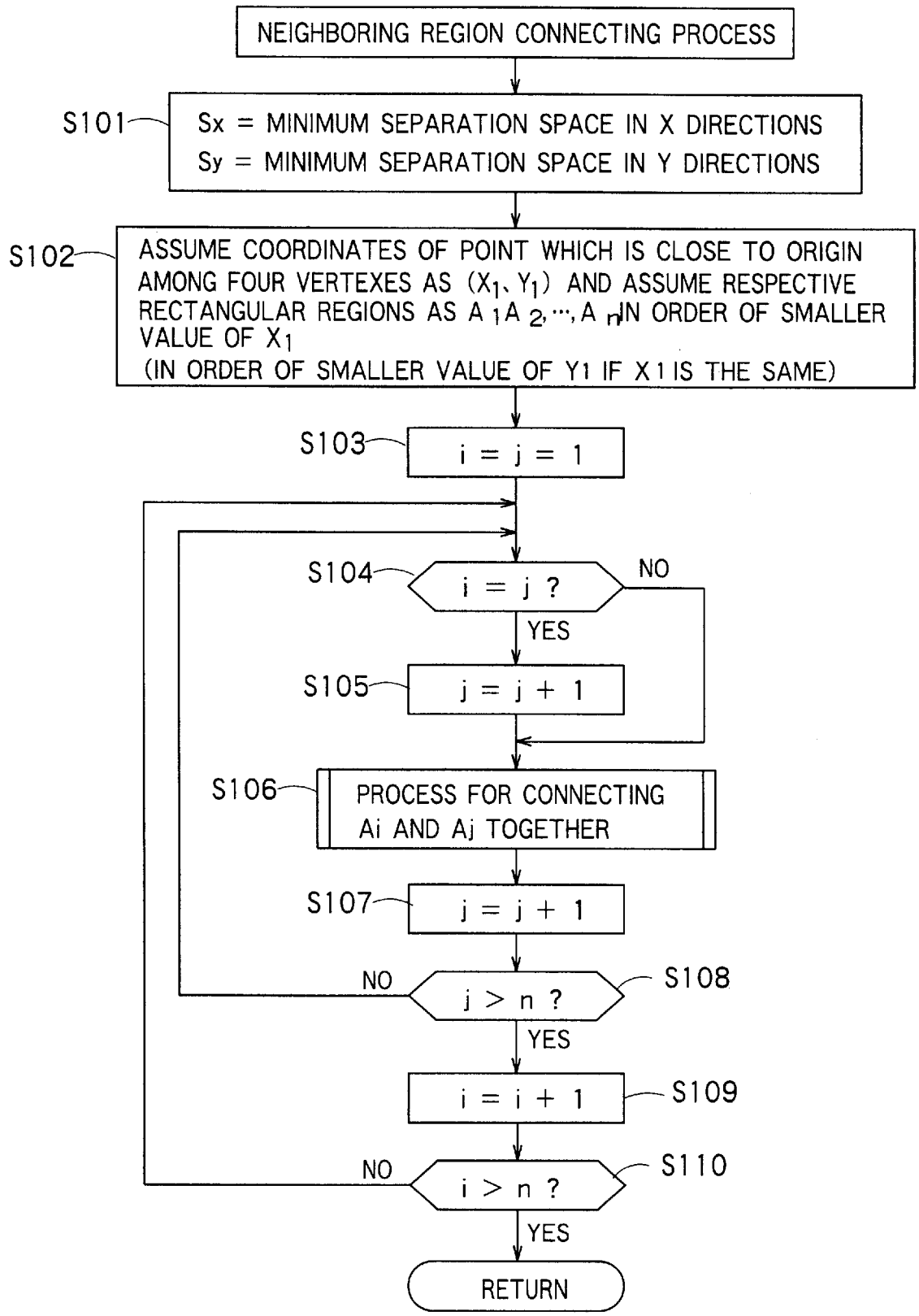
FIG. 9 is a flow chart for explaining the details of the procedure for carrying out a neighboring region connecting process.
Figure 11:
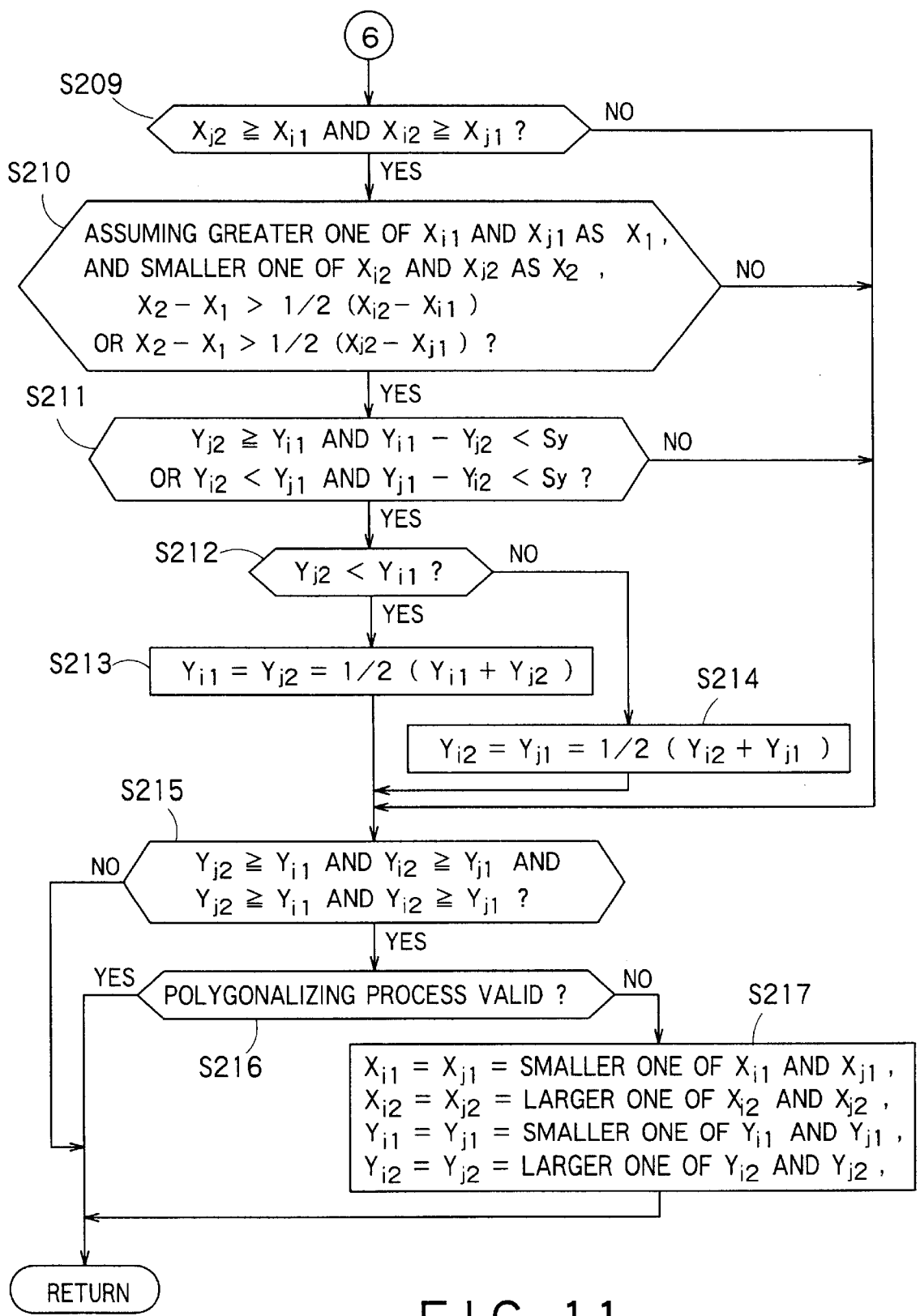

FIGS. 4 through 11 are flow charts for explaining the operation of an editing process in a marked region (which will be hereinafter referred to as a marked region editing process) using the image forming system in this preferred embodiment. Among these flow charts, FIGS. 4 through 6 are flow charts for explaining the outline of the marked region editing process, FIG. 7 is a flow chart for explaining the details of the procedure for carrying out an out-of-area color measurement, FIG. 8 is a flow chart for explaining the details of the procedure for carrying out a marker color assignment/color measurement, FIG. 9 is a flow chart for explaining the details of the procedure for carrying out a neighboring region connecting process, FIGS. 10 and 11 are flow charts for explaining the details of algorithm of the connecting process, and FIGS. 12 through 14 are illustrations showing the details of the operation of a marked region editing process.

As shown in FIG. 4, in the image forming system, a marker editing flag is set in an off state (step S1). If a user depresses a marked region editing button in order to execute a marked region editing process (step S2), the image forming system causes the marker editing flag to be turned on in accordance with the depression of the button (step S3). Thereafter, the image forming system determines whether a copy start key is depressed (step S4). If it is determined that the copy start key is depressed while the marker editing flag is turned on, the routine goes to step S5 and subsequent steps. If the copy start key is not depressed even if the marker editing flag is turned on, the routine returns to the step of detecting the depression of the marked region editing button. If it is determined that the copy start key is depressed while the marker editing flag is in the off state, only a usual copying operation is carried out, although this is not shown in FIG. 4. Even if the marker editing flag is turned on, the marker editing flag is turned off when parameters used for copying are initialized, this is not shown in the Figure either. In this preferred embodiment, the marked region editing button is a touch panel button, e.g., a button 62 shown in FIG. 12, which is displayed on a liquid crystal display (which will be hereinafter simply referred to as an LCD) for dedicated operations in the control panel 4.

If the marked region editing button 62 is depressed, the screen displayed on the LCD is switched to a screen for inspiring the user to select an editing mode as shown in FIG. 13. For example, the characters "Assign Editing Mode In Marked Region" are displayed in an operation indicating region of the LCD screen, and buttons 71 through 75 indicative of various editing modes are displayed. In this preferred embodiment, five kinds of editing modes including marker reshaping (button 71), frame attachment (button 72), half-tone dot meshing (button 73), decoloring (button 74) and marker color change (button 75) editing modes can be selected as shown in FIG. 13. The "marker reshaping" editing means a process for reshaping a region, in which lines manually drawn with a line marker in order to call a reader's attention to a part of character information and illustration information of the original D have been inclined or meandered, into a region surrounded by straight lines or rectangular. The "frame attachment" editing means a process for dividing image data, which have been obtained by scanning a manually marked region, into a frame portion and a ground portion other than the frame portion, on the basis of density difference and chrominance, for changing the frame portion into a portion of a desired color assigned by the user, and for outputting an image signal indicative thereof, together with character/illustration information, to the printer engine part 53. The "half-tone dot meshing" editing means a process for changing the ground portion of the manually marked region, which has been read by scanning, into a satin finished portion of desired density and color to output an image signal indicative of an image which appears as if a net is set in the marked region. The marker reshaping editing, the frame attachment editing and the half-tone dot meshing editing are editing processes which are carried out with respect to a region marked substantially in the same color as an assigned color (which will be hereinafter referred to as an assigned marker color). The "decoloring" editing means an editing process for removing the marker color in a region which is marked substantially in the same color as the assigned marker color. The "marker color change" editing means a process for changing the color of the manually marked region, which has been read by scanning, into a desired color and for outputting a signal indicative thereof. It is not always required to alternatively select only one of these editing modes, and a plurality of modes of these editing modes may be combined to be selected. For example, the combination of the marker reshaping with the half-tone dot meshing, or the combination of the frame attachment with the half-tone dot meshing may be selected.

Referring to the accompanying drawings, a process carried out when the marker reshaping editing mode has been selected will be mainly described below.

(1) Marker Reshaping Editing Mode

If the marker reshaping editing mode button 71 on the LCD screen is selected, the LCD screen is changed to a screen for inspiring the user to select a method for assigning the color of a marker which is an object to be edited (an operation indicating region 61) as shown in FIG. 14. According to this preferred embodiment, four methods are prepared as methods for assigning the color of the marker.

A method for "selecting the color of the marker from a list" (a button 81) is a method for selecting the color of the maker from a list of colors which have been previously registered. The registered colors include both of colors which have been registered by initialization, and colors which have been selected by the user in accordance with a method as described below and which have been registered by a method which will be described.

A method for "assigning the color of the marker by scanning a region outside of the original" (which will be hereinafter referred to as an out-of-area assignment) (a button 82) is a method for assigning the color of the marker by arranging a paper sheet 58, which has been painted in a desired assigned marker color, on a region of a glass other than a region on which the original has been mounted and by scanning the paper sheet to incorporate the color thereof. The out-of-region scanning paper piece(which will be hereinafter referred to as an out-of-area color assigning paper piece) 58 may have any sizes if it can be arranged on the original D to be mounted on the platen 212. In addition, the region painted in a color which is intended to be assigned must not always extend so as to correspond to the scanning direction, and may extend in an inclined direction. Moreover, a plurality of colors corresponding to the size of the out-of-area assigning paper piece 58, not only one color, may be applied. However, if this editing mode is selected, the paper piece other than the original D is mounted on the platen 212, so that an APS and an AMS are cleared and the user is required to assign the size of the original D.

Referring to FIG. 14 again, a method for "assigning the color of the marker by scanning the original" (a button 83) is a method for assigning the color by scanning colors, in which the original D has been painted with a line marker or the like, by reading the color of a part of the original and by selecting the color of the marker from the read colors to assign the selected color.

A method for "assigning the color of the marker by scanning the zeroth page (a color assigning paper sheet) (a button 84) is a method for assigning the color by preparing an optional color assigning paper sheet, by painting the color assigning paper sheet in a color which is intended to be assigned, by scanning the painted assigning paper sheet as the zeroth page original prior to the first page of the original D, by incorporating image data of the color in which the color assigning paper sheet has been painted, and by selecting the color of the marker from the incorporated colors to assign the selected color. A method for painting the color assigning paper sheet in the color which is intended to be assigned may be a method for painting the color assigning paper sheet in optional directions, in optional regions and in a plurality of desired colors, which method is similar to that shown with the out-of-area assigning paper piece 58 in FIG. 15.

Referring to the flow charts of FIGS. 4 through 6, the operations in the respective editing modes will be sequentially described below.

1) Method for Selecting from List

Figure 16:
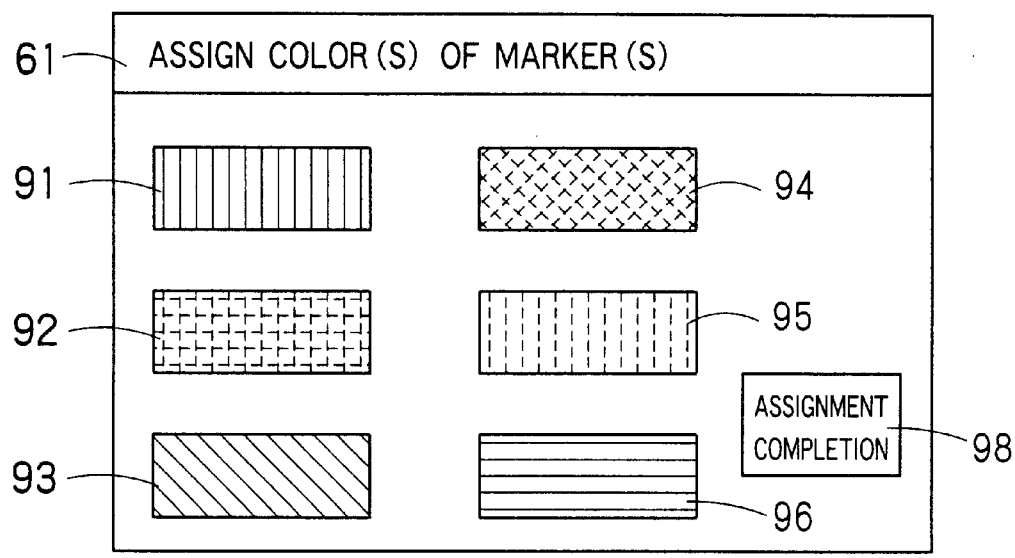
FIG. 16 is an illustration for explaining a method for assigning the color of a marker from a list.

If the button "Select From List" 81 is depressed, the LCD screen is changed to a screen for inspiring the user to assign the color of the marker as shown in FIG. 16. On the LCD screen, buttons 91 through 96 indicating previously registered colors together with their names are displayed. If a button corresponding to a desired color is depressed in accordance with the contents of the description of the operation indicating region 61 on the screen, and then, if an assignment completion button 98 is depressed, information about the color corresponding to the depressed button is stored in the RAM 34 of the basic processing part 50 via the I/F controller 28, and a marker color assignment completion flag is validated.

Referring to FIG. 4 again, if the start key is depressed (step S4), the scanner part 52 is driven on the basis of the command from the CPU 32 of the basic processing part 50 in accordance with the form in which the original D is mounted. If the original D is mounted on the platen 212 (step S5), the scanner part 52 remains being driven, so that the read image data of the original D are expanded on the page memory 30 (step S7). If the original D is mounted on the ADF 9, the ADF is driven in accordance with a command from the scanner CPU 15 (step S6), and the read image data are expanded on the page memory 30 (step S7).

Referring to FIG. 5, the marker color assignment completion flag has been already valid (step S8), and the color assigning paper sheet is not used herein, so that the routine goes to step S22 of FIG. 6. The image data expanded on the page memory 30 are transferred to the image processing part 25, so that a region substantially having the same color as the assigned marker color is recognized (step S22).

Then, a process for rectangularizing (polygonalizing) the region thus recognized is carried out by a known data processing (step S23), and a neighboring region connecting process, which is characteristic in this preferred embodiment, is carried out (step S24).

Figure 17A:
FIGS. 17A through 17D are illustrations for explaining a neighboring region connecting process.
Figure 17B:
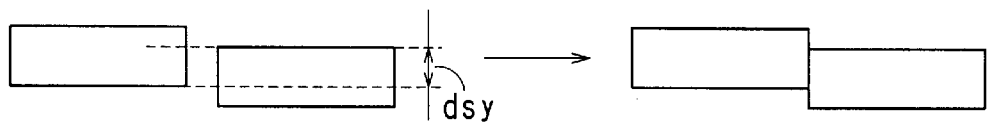

The neighboring region connecting process means a process for connecting neighboring rectangularized marked regions to each other in a direction when th marked regions are close to each other at a predetermined distance or less. The connecting direction is a direction in which the user intends to connect the marked regions. In this preferred embodiment, one or both of X and Y directions can be selected as the connecting direction. As an example, the X direction will be described in detail. For example, as shown in FIG. 17A, when there are two rectangular regions which are close to each other and which are spaced from each other by a distance dx in the X directions and the distance dx is equal to or smaller than the minimum space (which will be hereinafter referred to as the minimum separation space) which serves as a reference for determining whether the connecting process should be carried out, the process for connecting the two rectangular regions is carried out. The example shown on the right side of FIG. 17A is an example of a case where the polygonalizing process is invalidated. In this example, the boundary line between the connected two rectangular regions is erased to change the regions into a continuous rectangular region. When the neighboring regions are slightly shifted in the Y directions although the regions are arranged side by side substantially in the X directions as shown in FIG. 17B, if the length dsy of a common Y-coordinate portion in the Y directions is greater than 50% of the sides of the respective rectangles in the Y directions, the regions are connected in the X directions. The example illustrated on the right side of FIG. 17B shows a process which is carried out when the polygonalizing process is validated. In this example, the overlapping sides of the two rectangular regions are maintained.

Figure 17C:
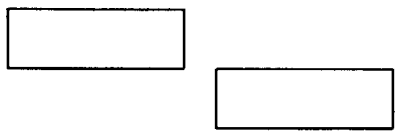
Figure 17D:
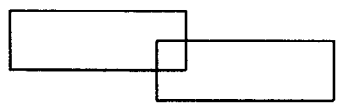

On the other hand, in this preferred embodiment, if there is no common Y-coordinate portion as shown in FIG. 17C, and if two rectangular regions have a common overlapping part as shown in FIG. 17D, their shapes are maintained.

Referring to the flow chart of FIG. 9, the details of the procedure for carrying out a neighboring region connecting process in this preferred embodiment will be described below. First, it is assumed that the minimum separation space in the x directions is Sx (>0) and the minimum separation space in the Y directions is Sy (>0) (step 101). Then, assuming that the number of the rectangular regions formed by the rectangularizing process is n, it is assumed that coordinates of a point, which is most close to an optionally set origin, among four vertexes of each of the rectangular regions are $(X_1, Y_1)$ and that the respective rectangular regions are $A_1, A_2, \ldots, A_n$ in order of the smaller value of $X_1$ (in order of the smaller value of $Y_1$ if the $X_1$ is the same) (step S102). Then, after i=j=1 is set (step S103), the value of j is counted up (steps S104, S105), and the connecting process is carried out until j>n while the positional relationship between Ai and Aj is determined (steps S106 through S108). Then, the value of i is counted up so that i=i+1 (step S109), the steps S104 through S109 are repeated until i>n. By such a process, it is possible to determine the positional relationship with respect to all of combinations of $A_1$ through $A_n$ and to execute the connecting process.

Figure 18:
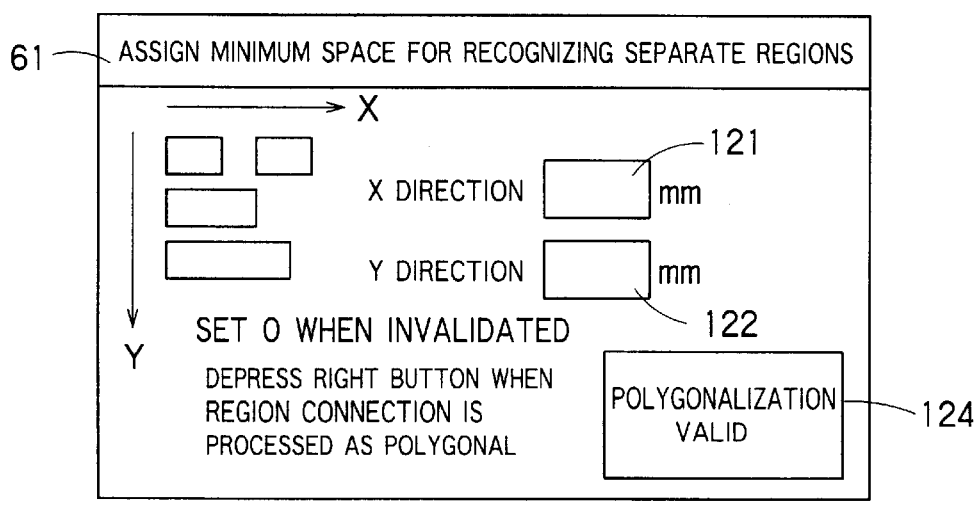
FIG. 18 is an illustration for explaining a method for assigning a minimum separation space.

FIG. 18 is an illustration showing a method for assigning the size of a minimum separation space. As shown in this figure, the characters "Assign Minimum Space For Recognizing Separate Regions" are displayed on the operation indicating region 61 of the LCD screen to inspire the user to assign the size of the minimum separation space. In this preferred embodiment, the connecting direction can be assigned in both of the X and Y directions (numerical value input areas 121, 122). The input of a numerical value is carried out by means of ten keys (not shown) of the control panel 51. If the connecting process is intended to be invalidated, "0" may be inputted as a numerical value. If the user intends to carry out the neighboring region connecting process while maintaining the polygonalized shape, a polygonalization validating button 124 is depressed. In order to lighten general user's operational load, the system may be formed so that the setting of the above described minimum separation space and so forth can not be carried out unless a customer engineer or user manager inputs a secret identification code.

Figure 19:
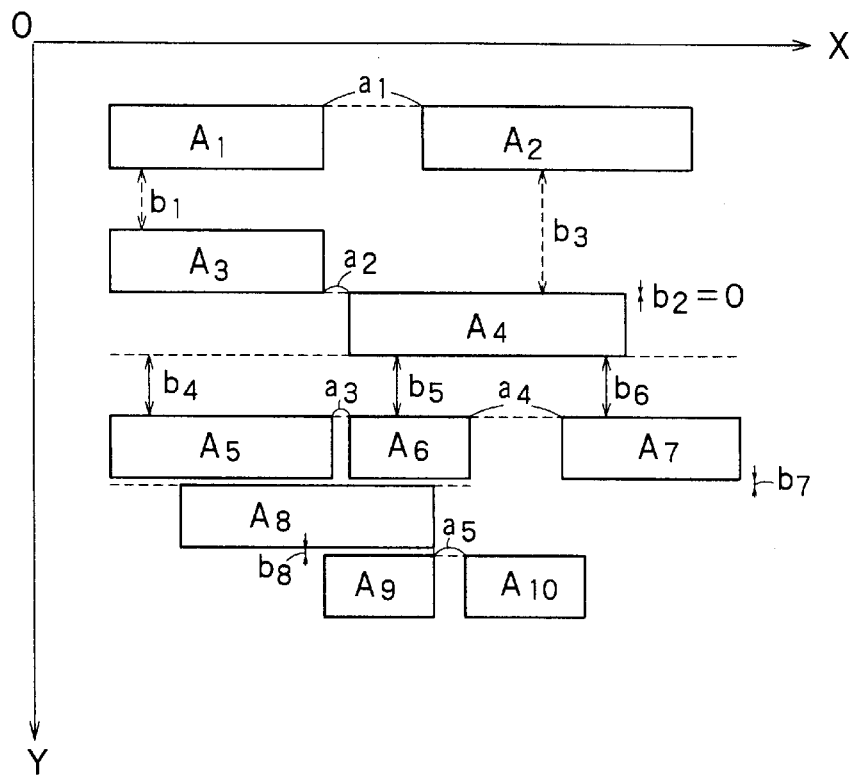
FIGS. 19 through 21 are illustrations for explaining a neighboring region connecting process with an example of rectangularized marked regions.

Referring to the accompanying drawings, the details of a method for connecting neighboring regions will be described below. FIG. 19 is a schematic diagram showing an example of rectangular regions $A_1$ through $A_{10}$ obtained after the rectangularizing process is completed. It is assumed that there are the following relationships between the spaces $a_1$ through $a_5$ (X directions) of each rectangular region and the minimum separation space Sx.

$$a_1 > Sx,\ a_2 < Sx,\ a_3 < Sx,\ a_4 > Sx,\ a_5 < Sx$$

It is also assumed that there are the following relationships between the spaces $b_1$ through $b_8$ (Y directions) of each rectangular region and the minimum separation space Sy.

$$b_1 > Sy,\ b_2 < Sy,\ b_3 > Sy,\ b_4 > Sy,\ b_5 > Sy,\ b_6 > Sy,\ b_7 < Sy,\ b_8 < Sy$$

Figure 20:
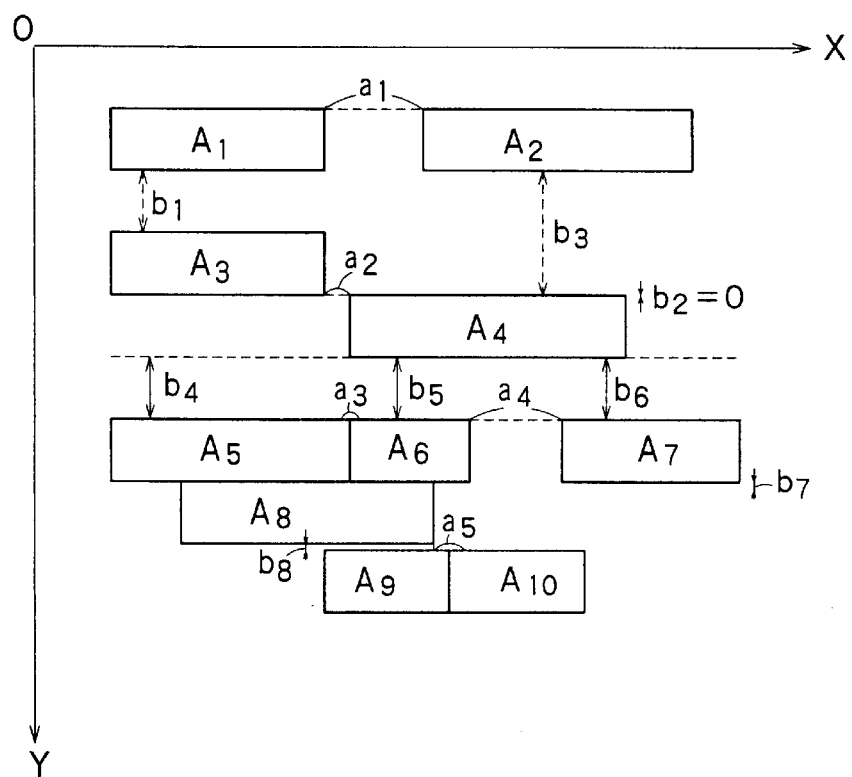
Figure 21:
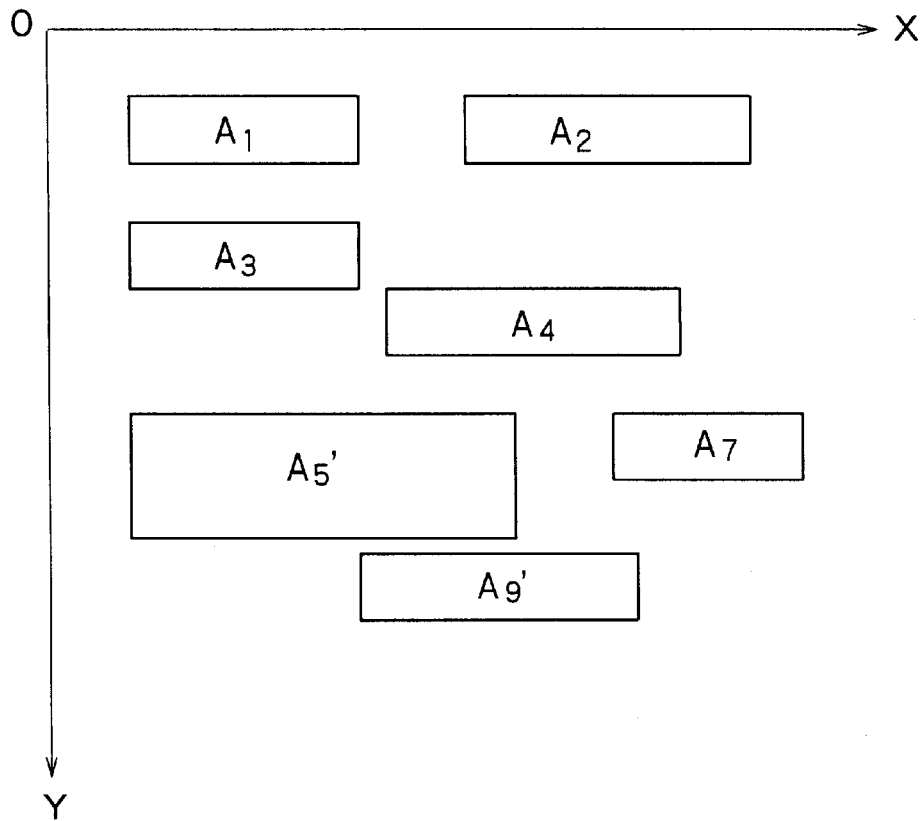

Therefore, since the connecting processes between $A_5$ and $A_6$ and between $A_5$, $A_6$ and $A_8$ are carried out, the shape is changed to a shape shown in FIG. 20 if it has been assigned that the polygonalizing process is valid. If the connecting process has been carried out with respect to the rectangular regions $A_1$ through $A_{10}$ shown in FIG. 19 and if it has not been assigned that the polygonalizing process is valid, the shape is changed to a shape shown in FIG. 21. As shown in this figure, the boundary lines between the connected rectangular regions $A_5$, $A_6$ and $A_8$, and the boundary line between the rectangular regions $A_9$ and $A_{10}$ are erased, and the rectangular region $A_8$ is extended so that the right and left sides of the rectangular region $A_8$ continuously extend from the sides of the corresponding rectangular regions $A_5$ and $A_6$.

Referring to the flow charts of FIGS. 10 and 11, the algorithm of the process for connecting a rectangular region Ai to a rectangular region Aj will be described below.

First, it is assumed that the coordinates of four vertexes of the rectangular region Ai are $(X_{i1}, Y_{i1})$, $(X_{i2}, Y_{i1})$, $(X_{i1}, Y_{i2})$ and $(X_{i2}, Y_{i2})$ wherein $X_{i1} < X_{i2}$ and $Y_{i1} < Y_{i2}$ (step S201). It is also assumed that the coordinate of four vertexes of the rectangular region Aj are $(X_{j1}, Y_{j1})$, $(X_{j2}, Y_{j1})$, $(X_{j1}, Y_{j2})$ and $(X_{j2}, Y_{j2})$ wherein $X_{j1} < X_{j2}$ and $Y_{j1} < Y_{j2}$ (step S202).

Then, a connecting process in the X directions is executed. First, it is determined whether the length dsy of a common portion, which has a common Y coordinate, of the rectangular region $A_i$ and the rectangular region $A_j$ in Y directions is equal to or greater than the side of the rectangular region $A_i$ or the rectangular region $A_j$ in Y directions. That is, it is determined whether there is a portion having a common Y coordinate by determining whether $Y_{j2} \geq Y_{i1}$ and $Y_{i2} \geq Y_{j1}$ are satisfied (step S203). If $Y_{j2} \geq Y_{i1}$ and $Y_{i2} \geq Y_{j1}$ are not satisfied (step S203), the routine goes to steps of FIG. 11 since there is no portion having a common Y coordinate. If $Y_{j2} \geq Y_{i1}$ and $Y_{i2} \geq Y_{j1}$ are satisfied (step S203), it is determined whether the length dsy of the common portion in Y directions is equal to or greater than 50% of the side of the rectangular region in Y directions, since there is a portion having a common Y coordinate. That is, assuming that a greater one of $Y_{i1}$ and $Y_{j1}$ is $Y_1$ and that a smaller one of $Y_{i2}$ and $Y_{j2}$ is $Y_2$, it is determined whether $Y_1$ and $Y_2$ meet the following relationship (step S204).

$$Y_2 - Y_1 > 1/2(Y_{i2} - Y_{i1})$$

or $$Y_2 - Y_1 > 1/2(Y_{j2} - Y_{j1})$$

If these relationships are not satisfied (step S204), the routine goes to steps of FIG. 11 since the regions are not arranged in X directions. On the other hand, if one of these relationships is satisfied (step S204), the distance dx between the rectangular region $A_i$ and the rectangular region $A_j$ is calculated to be compared with the minimum separation space Sx. That is, it is determined whether the following relationship is satisfied (step S205).

$$X_{j2} < X_{i1}\ \text{and}\ X_{i1} - X_{j2} < Sx$$

or $$X_{i2} < X_{j1}\ \text{and}\ X_{j1} - X_{i2} < Sx$$

If Both of these relationships are not satisfied (step S205), it is determined that recognition of the separation should be carried out, so that the routine goes to steps of FIG. 11. On the other hand, if one of these relationships is satisfied, a connecting process in the X directions is carried out in accordance with the positional relationship between the rectangular region $A_i$ and the rectangular region $A_j$. That is, if $X_{j2} < X_{i1}$ (step S206), 1/2 $(X_{i1} + X_{j2})$ is set to both the coordinate values of $X_{i1}$ and $X_{j2}$ (step S207), and if $X_{j2} \geq X_{i1}$ (step S206), 1/2 $(X_{j1} + X_{i2})$ is set to both the coordinate values of $X_{j1}$ and $X_{i2}$ (step S208).

Then, the routine goes to steps of FIG. 11 to execute a connecting process in the Y directions. First, it is determined whether $X_{j2} \geq X_{i1}$ and $X_{i2} \geq X_{j1}$ are satisfied to determine whether there is a portion having a common X coordinate (step S209). If $X_{j2} \geq X_{i1}$ and $X_{i2} \geq X_{j1}$ are not satisfied (step S209), the routine goes to step S215 since there is no portion having a common X coordinate. If $X_{j2} \geq X_{i1}$ and $X_{i2} \geq X_{j1}$ are satisfied (step S209), it is determined whether the length dsx of the common portion in X directions is equal to or greater than 50% of the side of the rectangular region in X directions, since there is a portion having a common X coordinate. That is, assuming that a greater one of $X_{i1}$ and $X_{j1}$ is $X_1$ and that a smaller one of $X_{i2}$ and $X_{j2}$ is $X_2$, it is determined whether $X_1$ and $X_2$ meet the following relationship (step S210).

$$X_2 - X_1 > 1/2(X_{i2} - X_{i1})$$

or $$X_2 - X_1 > 1/2(X_{j2} - X_{j1})$$

If these relationships are not satisfied (step S210), the routine goes to step S215 since the regions are not arranged in Y directions. On the other hand, if one of these relationships is satisfied (step S210), the distance dy between the rectangular region $A_i$ and the rectangular region $A_j$ is calculated to be compared with the minimum separation space Sy. That is, it is determined whether the following relationship is satisfied (step S211).

$$Y_{j2} < Y_{i1}\ \text{and}\ Y_{i1} - Y_{j2} < Sy$$

or $$Y_{i2} < Y_{j1}\ \text{and}\ Y_{j1} - Y_{i2} < Sy$$

If both of these relationships are not satisfied (step S211), it is determined that recognition of separation should be carried out, so that the routine goes to step S215. On the other hand, if one of these relationships is satisfied (step S211), a connecting process in the Y directions is carried out in accordance with the positional relationship between the rectangular region $A_i$ and the rectangular region $A_j$. That is, if $Y_{j2} < Y_{i1}$ (step S212), 1/2 $(Y_{i1} + Y_{j2})$ is set to both the coordinate values of $Y_{i1}$ and $Y_{j2}$ (step S213), and if $Y_{j2} \geq Y_{i1}$ (step S212), 1/2 $(Y_{i2} + Y_{j1})$ is set to both the coordinate values of $Y_{i2}$ and $Y_{j1}$ (step S214).

Then, it is determined whether a polygonalizing process is validated. That is, it is determined whether $Y_{j2} \geq Y_{i1}$ and $Y_{j2} \geq Y_{j1}$, and $Y_{j2} \geq Y_{i1}$ and $Y_{i2} \geq Y_{j1}$ are satisfied (step S215). If this relationship is not satisfied (step S215), it is not required to determine whether the polygonalizing process is valid or invalid, so that the connecting process between Ai and Aj is completed. On the other hand, if the relationship at step S215 is satisfied and if the polygonalizing process is valid (step S216), the shape obtained by the above described connecting process is maintained to end the routine. On the other hand, if the polygonalizing process is invalid, the boundary lines between the respective connected rectangular regions are erased, and each side of the region polygonalized in the X and Y directions is matched with the side of a larger one of the original rectangular regions. That is, the coordinate values of $X_{i1}$ and $X_{j1}$ are changed to a smaller coordinate value of $X_{i1}$ and $X_{j1}$, and the coordinate values of $X_{i2}$ and $X_{j2}$ are changed to a larger coordinate value of $X_{i2}$ and $X_{j2}$. Simultaneously, the coordinate values of $Y_{i1}$ and $Y_{j1}$ are changed to a smaller coordinate value of $Y_{i1}$ and $Y_{j1}$, and the coordinate values of $Y_{i2}$ and $Y_{j2}$ are changed to a larger coordinate value of $Y_{i2}$ and $Y_{j2}$ (step S217). After the above-described process, the process for connecting n rectangular regions ends.

Referring to FIG. 6 again, a plurality of editing modes can be simultaneously selected as described above. Therefore, if the user has also selected another editing mode, the selected editing process is executed with respect to the rectangularized (polygonalized) region in which the connecting process has been carried out (step S25). If other usual editing processes, such as centering and mirror image, have been assigned, these processes are executed.

After the above described series of editing processes are completed, the image data are supplied to the printer engine part 53 via the compressing/decompressing circuit 26 and the data switch/buffer memory 24 to print an image. If the next original D is mounted on the paper feeding table of the ADF 9 (step S27), the routine returns to step S6 to drive the ADF. If the original D is not mounted on the paper feeding table of the ADF 9 (step S27), the routine returns to immediately before step S4 to wait for the depression of the start key.

Thus, according to this preferred embodiment, the marked regions of the original are recognized to be changed to rectangular regions, and if there are neighboring rectangular regions, the marked region editing process for connecting the neighboring rectangular regions together is executed. Therefore, it is possible to provide an image including orderly line marks which have been obtained by correcting the turbulence of manually marked lines.

2) Out-Of-Area Assigning Method

Referring to FIGS. 4 through 7, an out-of-area assigning method will be described below.

As described above, this assigning method can be selected when the manually fed original is read and when the size of the original D is smaller than the size of the glass of the platen 212.

First, after the user depresses the marked region editing button 62 (see FIG. 12) and selects the marked region editing mode, the user depresses the "assignment by scanning out-of-origin region" button 82 (see FIG. 14). Thus, the assignment of recognition of the out-of-area color is validated.

Figure 15:
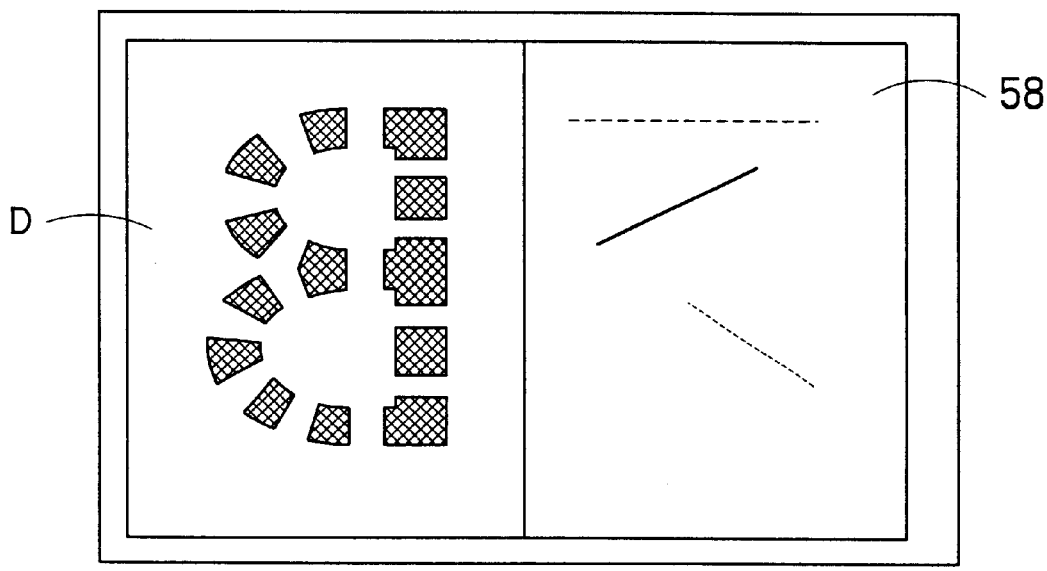
FIG. 15 is an illustration for explaining a method for assigning the color of a marker by out-of-area assignment.

Then, the original D is mounted on the platen 212, and the out-of-area color assigning paper piece 58 painted in a desired assigned marker color is mounted in a surplus region on the glass (see FIG. 15). Moreover, the size of the original D is assigned.

Thereafter, as shown in FIG. 4, if the start key is depressed (step S4), it is determined that the origin is manually fed to be read (step S5), and the original D and the out-of-area color assigning paper piece 58 are scanned by the scanner part 52 while the original D and the out-of-area color assigning paper piece 58 are mounted on the platen 212, so that the image data of the original D and the out-of-area color assigning paper piece 58 are expanded on the page memory 30 (step S7).

Referring to FIG. 5 again, at this time, the marker color assignment completion flag is invalid (step S8), and the out-of-area color recognition assignment is valid (step S9), so that the routine goes to the out-of-area color measuring step (step S10).

FIG. 7 is a flow chart for explaining the details of the procedure for carrying out an out-of-area color measuring step.

First, i=1 is set (step S81) to recognize regions which are other than that of the original D and which continue in a region other than that in the paper color (which will be hereinafter referred to as non-paper color regions), from image data expanded on the page memory 30. Assuming that the number of the recognized regions is n, the non-paper color regions R1 through Rn are determined (step S82). While the value of i is equal to or smaller than n, the range of color components of the continuous non-paper color region Ri is determined (step S84). The range of density of the continuous non-paper color region Ri is widened to some extent. Then, i=i+1 is set (step S85) to repeat step S84 until i>n (steps S83 through S85). Thus, all of data of colors applied on the out-of-area color assigning paper piece 85 are stored in the RAM 34. Each of data is numbered as Color_0 through Color_n.

Figure 22:
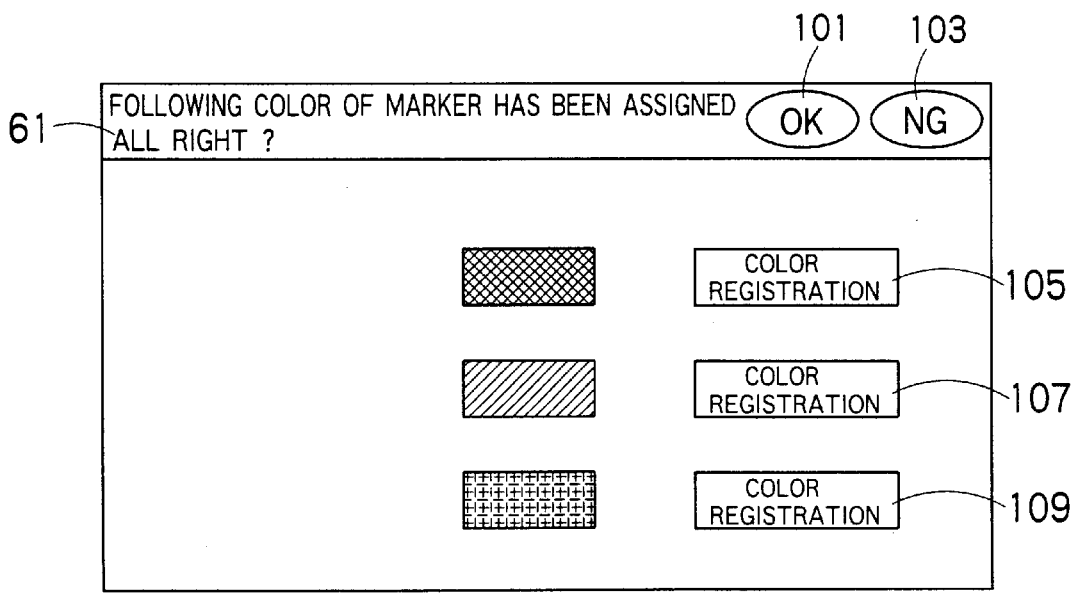
FIG. 22 is an illustration for explaining a method for confirming a color component determined by out-of-area assignment.

Referring to FIG. 5 again, the procedures for confirming and registering the determined color components are executed (steps S13 through S19). Specifically, the color components of Color_0 through Color_n are first displayed on the LCD with the respective colors (step S13). FIG. 22 shows an example of such an LCD screen. Three assigned marker colors using n=3 are herein displayed for simplified explanation. In the operation indicating region 61, explanation for inspiring the user to confirm the assigned marker colors is displayed. An OK button 101 and an NG button 103 are also displayed in the operation indicating region 61. In vicinity of the respective displayed assigned marker colors, color registering buttons 105, 107 and 109 are displayed. If the user depresses a color registering button (FIG. 5, step S14), the LCD screen is changed as shown in, e.g., FIG. 23. In the example shown in this figure, explanation for inspiring the user to input a name to be registered is displayed, and alphabet buttons are displayed so that the user can optionally name. If the user inputs the name to be registered, the inputted name is displayed on the name display part 111. If the user confirms the displayed name and depresses a decision button 113, the set of the color component and the name is registered (FIG. 5, step S15). If the registration of one assigned marker color is completed, the LCD screen returns to the screen shown in FIG. 22 to inspire the user to carry out the next color registration. If all of color registrations are completed or if the NG button 103 is depressed on the way of a color registration or without registering colors (step S16), all of color components of Color_0 through Color_n stored in the RAM 34 are discarded (step S17), and the routine returns to immediately before step S9 at which it is determined whether the selected out-of-area color recognition assignment is valid or invalid, so that a marker color assigning method can be selected again.

If the OK button 101 is depressed without the depression of the NG button 103, the color components of Color_0 through Color_n are stored as assigned marker colors (step S19).

Then, the marker color assignment completion flag is validated as shown in FIG. 6 (step S20). Since the color assigning paper sheet is not used (step S21), the routine goes to step S22 to transfer the image data of the original D, which have been expanded on the page memory 30, to the image processing part 25 to recognize a region substantially having the same color as the marker color which has been assigned in the above described out-of-area color measuring procedure (step S22).

Then, the process for rectangularizing (polygonalizing) the region thus recognized is executed (step S24), and the above described neighboring region connecting process is executed (step S24). If the user has also selected another editing mode, the selected editing mode is executed with respect to the connected rectangular (polygonal) region (step S25). If other general editing processes, such as centering and mirror image, are assigned, these processes are executed.

After the above described series of editing processes are completed, the image data are supplied to the printer engine part 53 via the compressing/decompressing circuit 26 and the data switch/buffer memory 24 (step S26) to print an image.

Thereafter, the system stands by until the next original is mounted on the platen 212 (step S27) and the start key is depressed (step S4).

3) Assigning Method by Original Scan

Referring to the accompanying drawings, an assigning method by original scan will be described below. As described above, this assigning method is a method for selecting an assigned marker color from colors in which the original D has been painted. The original D may be mounted on the ADF 9 or the platen 212.

As shown in FIG. 4, after the marked region editing button 62 (see FIG. 12) is first depressed (step S2) to select the marked region editing mode (see FIG. 13), the "Assignment By Original Scan" button 83 (see FIG. 14) is depressed.

If the start key is depressed (step S4), the ADF is driven (step S6) when the original D has been mounted on the ADF (step S5), and the original D is scanned to be read. When the original D has been manually mounted (step S5), the original D is scanned without driving the ADF 9 (step S7). The image data thereof are thus read to expand the read image data on the page memory 30.

Referring to FIG. 5 again, at this time, the marker color assignment completion flag is invalid (step S8), and the out-of-area color recognition assignment is invalid (step S9), so that the image data expanded on the page memory 30 are displayed on the LCD screen (step S11).

Figure 24:
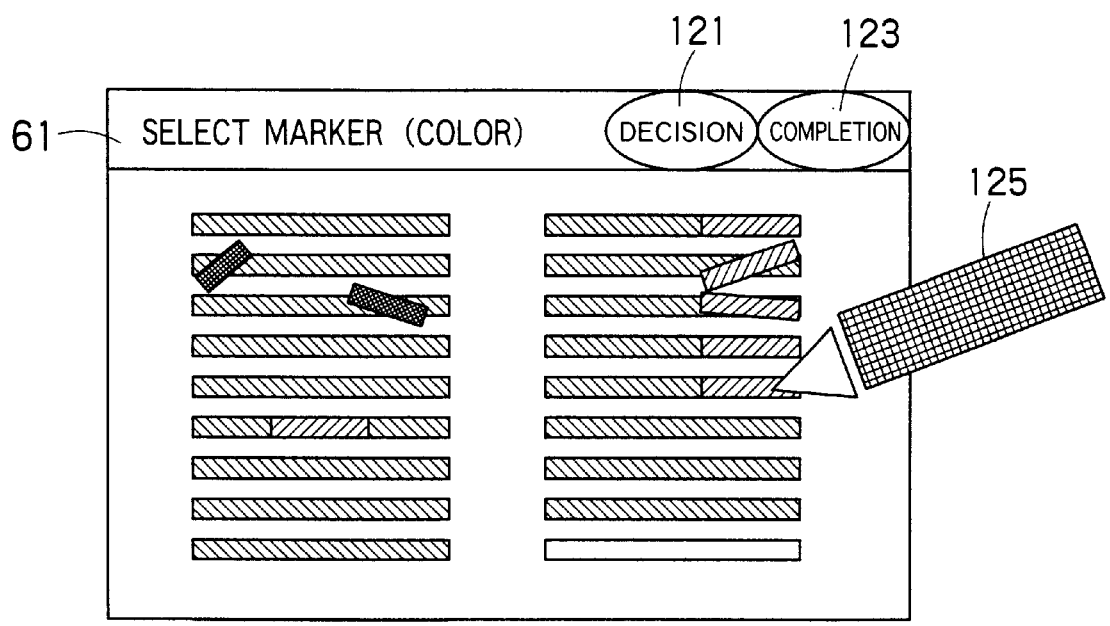
FIG. 24 is an illustration for explaining a method for assigning the color of a maker by an original scan.

FIG. 24 shows an example of an LCD screen on which the image data of the read original D are displayed. As shown in this figure, the image of the original D painted in a plurality of colors with line markers is displayed on the LCD screen. In the operation indicating region 61 of the LCD screen, explanation for inspiring the user to select marker colors is displayed, and a decision button 121 and a completion button 123 are also displayed. Among these displayed contents, all of the image portion of at least the original D, the decision button 121 and the completion button 123 are displayed on a touch panel.

In this preferred embodiment, such an LCD screen is used for assigning substantially the same color as the color, in which the original D has been painted, as a marker color. This procedure is called a "marker color assignment/color measurement" (step S12).

Referring to the flow chart of FIG. 8, the details of the marker color assignment/color measurement procedure will be described below. First, the value of a counter i is set to be 1 (step S91). Then, the user selects a color, which is intended to be assigned, from a region in which the image of the original D has been displayed on the LCD screen, and touches a corresponding region with the user's finger or a dedicated pen for touch panel 125 and so forth. The control panel CPU 1 detects the finger touch on the touch panel (step S92) to acquire finger touch coordinates (step S93) and causes color components of an image at the acquired finger touch coordinates to be temporarily stored in the RAM 3 (see FIG. 3) (step S94). If the user depresses the decision button 121 (step S95), the color components temporarily stored in the RAM 3 are stored in the RAM 34 of the basic processing part 50 as Color_i (i=1) (step S96). If the position at which the user's finger has touched is different from the region of the color intended to be assigned, the user may touch a desired region again without depressing the decision button 121 (step S95). The user can select a plurality of colors from the regions displayed on the screen. Therefore, until the completion button 123 is depressed (step S97), the above described steps S92 through S96 are repeated while counting up as i=i+1 (step S98). If the completion button 123 is depressed, n=i is set to complete the marker color assignment/color measurement procedure, and the routine goes to step S13 and subsequent steps of FIG. 5 for assigned marker color confirmation.

The colors of the color components of Color_0 through Color_n stored in the RAM 34 of the basic processing part 50 are displayed on the LCD (step S13). If the user depresses the color registration button (step S14) to input the registered name and if the user confirms the name which is displayed on the name display part (see FIG. 23) of the LCD screen and depresses the decision button 113 (see FIG. 23), the set of the color component and the name is registered (step S15). If the completion of all of colors desired by the user ends or if the NG button (see FIG. 22) is depressed on the way of the color registration or without registering colors (step S16), all of the color components of Color_0 through Color_n stored in the RAM 34 are discarded (step S17), and the routine returns to immediately before step S9 at which it is determined whether the selected out-of-area color recognition assignment is valid or invalid, so that a marker color assigning method can be selected again.

If the OK button 101 (see FIG. 22) is depressed without depressing the NG button 103 (step S18), the color components of Color_0 through Color_n are stored as assigned marker colors (step S19). Thus, the marker color assignment completion flag is validated (FIG. 6, step S20). Since no color assigning paper sheet is herein used (step S21), the routine goes to step S22 to transfer the image data of the original D, which has been expanded on the page memory 30, to the image processing part 25 to recognize a region substantially having the same color as the marker color which has been assigned in the above described out-of-area color measuring procedure (step S22).

Then, the process for rectangularizing (polygonalizing) the region thus recognized is executed (step S23), and the above described neighboring region connecting process is executed (step S24). If the user has also selected another editing mode, the selected editing mode is executed with respect to the connected rectangular (polygonal) region (step S25). If other general editing processes, such as centering and mirror image, are assigned, these processes are executed.

After the above described series of editing processes are completed, the image data are supplied to the printer engine part 53 via the compressing/decompressing circuit 26 and the data switch/buffer memory 24 to print an image. Moreover, if the next original D has been mounted on the paper feeding table of the ADF 9 (step S27), the routine returns to step S6 of FIG. 4 to drive the ADF. If the original D has not been mounted on the paper feeding table of the ADF 9 (step S27), the routine returns to step S4 of FIG. 4 to stands by until the start key is depressed.

4) Assigning Method by Color Assigning Paper Sheet Scan

First, a color assigning paper sheet is painted in a color which is intended to be assigned.

Then, as shown in FIG. 4, after the marked region editing button (see FIG. 12) is depressed (step S2) to select the marked region editing mode (see FIG. 12), the "Assignment By Zeroth Page (Color Assigning Paper Sheet) Scan" button 84 (see FIG. 14) is depressed.

Then, the color assigning paper sheet is mounted as the zeroth page below the first page of the original D to be mounted on the original tray 208 of the ADF 9 or to be sequentially mounted on the platen 212 from the zeroth page.

When the start key is depressed (step S4) and if the color assigning paper sheet has been set on the ADF 9 (step S5), the ADF is driven (step S6) and the scanner part 52 scans the color assigning paper sheet. The read image data are expanded on the page memory 30 (step S7). If the color assigning paper sheet has been manually mounted (step S5), the scanner part 52 scans the color assigning paper sheet, and the read image data are expanded on the page memory 30 (step S7).

Referring to FIG. 5, at this time, the marker color assignment completion flag is invalid (step S8), and the out-of-area color recognition assignment is invalid (step S9), so that the image data expanded on the page memory 30 are displayed on the LCD screen (see FIG. 24) (step S11).

The method and procedure for selecting assigned marker colors using the image data of colors in which the color assigning paper sheet has been painted and which has been scanned to be displayed on the LCD screen (step S12) are substantially the same as the above described assigning method and procedure by the original scan in 3). Therefore, the details of the procedure are substantially the same as the flow chart of FIG. 8, so that the descriptions thereof are omitted herein.

Figure 23:
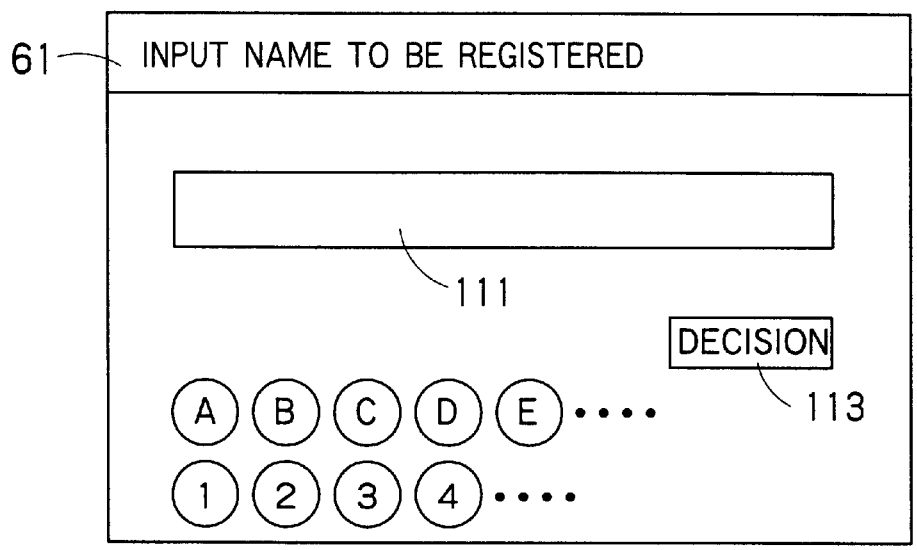
FIG. 23 is an illustration for registering a color component which has been determined by out-of-area assignment and confirmed.

As shown in FIG. 22, the images of the colors having the color components of Color_0 through Color_n selected on the LCD screen are displayed on the LCD screen (step S13). If the user depresses a color registering button (step S14) and inputs a registered name while viewing the LCD screen as shown in FIG. 23 and depresses the decision button 113, the set of the color component and the name is registered (step S15). If the registration of all of colors intended to be assigned by the user ends or if the NG button 103 (see FIG. 22) is depressed on the way of a color registration or without registering colors (step S16), all of the color components of Color_0 through Color_n stored in the RAM 34 are discarded (step S17), and the routine returns to immediately before step S9 at which it is determined whether the selected out-of-area color recognition assignment is valid or invalid. If the OK button 101 (see FIG. 22) is depressed without depressing the NG button 103 (step S18), the color components of Color_0 through Color_n are stored as assigned marker colors (step S19).

Referring to FIG. 6, since the assignment of the marker color is completed if the color components of Color_0 through Color_n are stored, the marker color assignment completion flag is validated (step S20). Since this time is immediately after the zeroth page has been scanned to be assigned and the color assigning paper sheet has been scanned (step S21), the routine goes to immediately before step S27. If the color assigning paper sheet has been manually mounted (step S27), the color assigning paper sheet is removed from the platen 212, and the first page of the original D is mounted thereon. Then, as shown in FIG. 4, the start key is depressed (step S4). Thus, the first page of the original is scanned to be read and the read image data are expanded on the page memory 30 (step S7). On the other hand, if the color assigning paper sheet has been set in the ADF 9 (step S27 of FIG. 6), the ADF 9 is driven (step S6 of FIG. 4), the first page of the original is scanned to be read and the read image data are expanded on the page memory 30 (step S7).

Referring to FIG. 5 again, since the marker color assignment completion flag has been valid (step S8), the routine goes to immediately before step S21 of FIG. 6.

Since the scanning of the color assigning paper sheet has been completed and the first page of the original D has been read (step S21), the image data of the original D expanded on the page memory 30 are transferred to the image processing part 25. The image processing part 25 recognizes a region substantially having the same color as the marker color which has been selected and assigned using the above described color assigning paper sheet (step S22).

Then, the process for rectangularizing (polygonalizing) the region thus recognized is executed (step S23), and the above described neighboring region connecting process is executed (step S24). If the user has also selected another editing mode, the selected editing mode is executed with respect to the connected rectangular (polygonal) region (step S25). If other general editing processes, such as centering and mirror image, are assigned, these processes are executed.

After the above described series of editing processes are completed, the image data are supplied to the printer engine part 53 via the compressing/decompressing circuit 26 and the data switch/buffer memory 24 to print an image. If the next original D has been mounted on the paper feeding table of the ADF 9 (step S27), the routine returns to immediately before step S6 of FIG. 4 to drive the ADF. If the original D has not been mounted on the paper feeding table of the ADF 9 (step S27), the routine returns to immediately before step S4 of FIG. 4 to wait for the depression of the start key.

(2) Frame Attachment Editing Mode

If a frame attachment editing mode is selected, a paper color (background color) portion is distinguished from a portion of characters and illustrations on the basis of density difference and chrominance to leave only the outermost portion of the image data of the paper color portion by a predetermined pixel width and remove the rest, with respect to the image data of the marked region which substantially has the same color components as those of the assigned marked colors and which are image data of the rectangular region having being connected by the connecting process, by the image processing part 25 at step S25 of FIG. 6 among the above described series of steps. Thus, an image with a frame surrounding the portion of characters and illustrations of the original D is formed. The above described pixel width can be changed by the user.

(3) Half-Tone Dot Meshing Editing Mode

If a half-tone dot meshing editing mode is selected, the image processing part 25 replaces the image data of the marked region, which substantially has the same color components as those of the assigned marker colors, with dot data having a predetermined size and a predetermined density, at step S25 of FIG. 6 among the above described series of steps. Thus, an image having a half-tone dot meshing in the marked region is formed. The density of dots can be changed by the user.

(4) Decoloring Editing Mode

If a decoloring editing mode is selected, the region having been painted in the assigned marker colors may be recognized (step S22) with respect to the image data transferred from the page memory 30 to the image processing part 25 at step S25 of FIG. 6 among the above described series of steps, and thereafter, data of the recognized color components may be erased in the editing process at step S25. Therefore, the region rectangularizing (polygonalizing) process (step S23) and neighboring region connecting process (step S24), which are subsequent to step S22, are not executed.

(5) Marker Color Change Editing Mode

If a marker color editing mode is selected, the user is required to assign a color to which the marker color is intended to be changed. The color assigning method after the change may cause the user to select the color from predetermined colors as shown in FIG. 16, or may use any one of the above described various color registering methods. In either case, if the marker color change editing mode is selected, the region which has been painted in the assigned marker color is recognized (step S22) with respect to the image data transferred from he page memory 30 to the image processing part 25, at steps of FIG. 6 among the above described series of steps, and thereafter, the recognized color component may be changed to the changed color of the marker, which has been assigned by the user, in the editing process at step S25.

Finally, a method for causing the user to change the assigned marker color in a job for sequentially reading a series of originals will be described. In order to change the assigned marker color in such a job, characters and a marker color changing button 130 are displayed on the LCD as shown in FIG. 25 while the job is executed.

If the user depresses the marker color changing button 130 the image forming system detects the depression of the button 130 to invalidate the marker color assignment completion flag which has been valid in FIG. 6. Then, the user is caused to assign a marker color again to change the marker color to the newly assigned marker color.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An image editing system comprising:

a color scanner; and an image processing part for processing image data obtained by reading a document by means of said color scanner;

wherein said color scanner reads a first original which includes a portion of a character or diagram having a first color, and a portion which is marked in second color different from the first color so as to cover information of the character or diagram, and said image processing part rectangularizes the shape of the contour of the marked portions on the basis of the image data of the marked portions, recognizes the position of vertexes of the rectangularized regions, connects the rectangularized regions neighboring each other on the basis of positional information of the vertexes and prepares image data including information of the shape of the connected regions and the character or diagram in the connected regions.

2. The image editing system according to claim 1, wherein said image processing part erases information of the second color except for at least a part of a peripheral portion of the rectangularized regions and prepares image data of a thin line having the second color on the basis of image data of the connected regions.

3. The image editing system according to claim 1, wherein said image processing part carries out a half-tone dot meshing for image data of the connected regions.

4. The image editing system according to claim 1, wherein the second color includes a plurality of colors, and said image processing part edits a portion of the image data of the connected regions, the portion of the image data having the second color which is substantially the same as a desired color.

5. The image editing system according to claim 4, which further comprises:

a storage device for previously storing therein image data of a plurality of third colors;

a color display unit for displaying the third colors; and an input unit for selecting the desired color from the third colors displayed on the color display unit and for inputting the selected color to said image processing part.

6. The image editing system according to claim 4, wherein said color scanner reads a second original for assigning the desired color, the second original being painted in a fourth color, and said image editing system further comprises:

a color display unit for displaying image data of the second original which is read by said color scanner; and an input unit for selecting the desired color from the fourth color displayed on said color display unit and for inputting the selected color to said image processing part.

7. The image editing system according to claim 4, which further comprises:

a color display unit for displaying image data of the first original read by said color scanner; and an input unit for selecting the desired color from the second color, which has been read by said color scanner and which has been displayed on said color display unit and for inputting the selected color to said image processing part.

8. The image editing system according to claim 1, wherein the second color includes a plurality of colors, and said image processing part erases a portion of the image data of the connected regions, the portion of the image data having the second color which is substantially the same as a desired color.

9. The image editing system according to claim 1, wherein said image processing part changes the second color to a desired color.

10. An image forming system comprising:

a color scanner;

an image processing part for processing image data obtained by reading a document by means of said color scanner; and an image forming part for forming an image on the basis of image data processed by said image processing part;

wherein said color scanner reads a first original which includes a portion of a character or diagram having a first color, and a portion which is marked in a second color different from the first color so as to cover information of the character or diagram, and said image processing part rectangularizes the shape of the contour of the marked portions on the basis of the image data of the marked portion, recognizes the position of vertexes of the rectangles, connects the rectangularized regions neighboring each other on the basis of positional information of the vertexes and prepares image data including information of the shape of the connected regions and the character or diagram in the connected regions.

11. The image forming system according to claim 10, wherein said image processing part erases information of the second color except for at least a part of a peripheral portion of the rectangularized regions and prepares image data of a thin line having the second color on the basis of image data of the connected regions.

12. The image forming system according to claim 10, wherein said image processing part carries out a half-tone dot meshing for image data of the connected regions.

13. The image forming system according to claim 10, wherein the second color includes a plurality of colors, and said image processing part edits a portion of the image data of the connected regions, the portion of the image data having the second color which is substantially the same as a desired color.

14. The image forming system according to claim 13, which further comprises:

a storage device for previously storing therein image data of a plurality of third colors;

a color display unit for displaying the third colors; and an input unit for selecting the desired color from the third colors displayed on said color display unit and for inputting the selected color to said image processing part.

15. The image forming system according to claim 13, wherein said color scanner reads a second original for assigning the desired color, the second original being painted in a fourth color, and said image editing system further comprises:

a color display unit for displaying image data of the second original which is read by said color scanner, and, an input unit for selecting the desired color from the fourth color displayed on said color display unit and for inputting the selected color to said image processing part.

16. The image forming system according to claim 13, which further comprises:

a color display unit for displaying image data of the first original read by said color scanner; and an input unit for selecting the desired color from the second color which has been read by said color scanner and which has been displayed on said color display unit and for inputting the selected color to said image processing part.

17. The image forming system according to claim 10, wherein the second color includes a plurality of colors, and said image processing part erases a portion of the image data of the connected regions, the portion of the image having the second color which is substantially the same as a desired color.

18. The image forming system according to claim 10, wherein said image processing part changes the second color to a desired color.

* * * * *